(12) United States Patent
Smalley et al.

(10) Patent No.: US 6,790,425 B1
(45) Date of Patent: Sep. 14, 2004

(54) MACROSCOPIC ORDERED ASSEMBLY OF CARBON NANOTUBES

(75) Inventors: Richard E. Smalley, Houston, TX (US); Daniel T. Colbert, Houston, TX (US); Ken A. Smith, Katy, TX (US); Deron A. Walters, Orlando, FL (US); Michael J. Casavant, Houston, TX (US); Chad B. Huffman, Houston, TX (US); Boris I. Yakobson, Houston, TX (US); Robert H. Hague, Houston, TX (US); Rajesh Kumar Saini, Houston, TX (US); Wan-Ting Chiang, Sugarland, TX (US)

(73) Assignee: Wiliam Marsh Rice University, Houston, TX (US)

( * ) Notice: Subject to any disclaimer, the term of this patent is extended or adjusted under 35 U.S.C. 154(b) by 0 days.

(21) Appl. No.: 09/890,030

(22) PCT Filed: Oct. 27, 2000

(86) PCT No.: PCT/US00/29722

§ 371 (c)(1),
(2), (4) Date: Jul. 24, 2001

(87) PCT Pub. No.: WO01/30694

PCT Pub. Date: May 3, 2001

(51) Int. Cl.$^7$ .................................................. D01F 9/12

(52) U.S. Cl. .............................. 423/447.1; 423/445 R; 423/447.2

(58) Field of Search .................. 423/445 R, 445 B, 423/447.3, 447.1, 447.2

(56) References Cited

U.S. PATENT DOCUMENTS

| | | | |
|---|---|---|---|
| 5,424,054 A | * | 6/1995 | Bethune et al. ........... 423/447.2 |
| 6,250,984 B1 | * | 6/2001 | Jin et al. ...................... 445/51 |
| 6,265,466 B1 | | 7/2001 | Glatkowski et al. |
| 6,299,812 B1 | * | 10/2001 | Newman et al. ......... 264/176.1 |
| 6,312,303 B1 | | 11/2001 | Yaniv et al. |
| 6,465,132 B1 | * | 10/2002 | Jin ........................... 429/231.8 |

FOREIGN PATENT DOCUMENTS

WO     WO 01/92381 A1    12/2001

OTHER PUBLICATIONS

Cheng, H.M. et al, "Bulk morphology and dimaeter distribution of sinle–walled carbon nanotubes synthesized by catalytic decomposition of hydrocarbons", Jun. 19, 1998, Chemical Physics Letters 289, pp. 602–610.*
de Heer, Walt A et al, "Aligned carbon nanotube films: Production and optical and electronic properties", May 12, 1995, Science 268, pp. 845–847.*
Chen, Jian et al., "Solution Properties of Single–Walled Carbon Nanotubes", Oct. 2, 1998, Science 282, pp. 95–98.*
Wong, S.S. et al., "Covalently–Functionalized Single–Walled Carbon Nanotube Probe Tips for Chemical Force Microscopy", Aug. 5, 1998, J. American Chemical Society 120, pp. 8557–8558.*
Yamamoto, et al., "Orientation of Carbon Nanotubes Using Electrophoresis," *Japanese Journal of Applied Physics*, Part 2–Letters, vol. 35, Issue 7B, 1996, pp. L917–L918.
Bubke, et al., "Optical anisotropy of dispersed carbon nanotubes induced by an electric field," *Applied Physics Letters*, vol. 71, No. 14, Oct. 6, 1997, pp. 1906–1908.
Avigal, et al., "Growth of aligned carbon nanotubes by biasing during growth," *Applied Physics Letters*, vol. 78, No. 16, Apr. 16, 2001, pp. 2291–2293.
Chen, et al., "Aligning single–wall carbon nanotubes with an alternating–current electric field," *Applied Physics Letters*, vol. 78, No. 23, Jun. 4, 2001, pp. 3714–3716.
Hone, et al., "Electrical and thermal transport properties of magnetically aligned single wall carbon nanotube films," *Applied Physics Letters*, vol. 77, No. 5, Jul. 31, 2000, pp. 666–668.
Liu, et al., "An electron energy–loss study of the structural and electronic properties of magnetically aligned single wall carbon nanotubes," *Synthetic Metals*, 121 (2001), pp. 1183–1186.
Smith, et al., "Structural anistropy of magnetically aligned single wall carbon nanotube films," *Applied Physics Letters*, vol. 77, No. 5, Jul. 31, 2000, pp. 663–665.

(List continued on next page.)

*Primary Examiner*—Stuart L. Hendrickson
*Assistant Examiner*—Peter J Lish
(74) *Attorney, Agent, or Firm*—Ross Spencer Garsson Winstead Sechrest & Minick P.C.

(57) ABSTRACT

The present invention is directed to the creation of macroscopic materials and objects comprising aligned nanotube segments. The invention entails aligning single-wall carbon nanotube (SWNT) segments that are suspended in a fluid medium and then removing the aligned segments from suspension in a way that macroscopic, ordered assemblies of SWNT are formed. The invention is further directed to controlling the natural proclivity of nanotube segments to self assemble into ordered structures by modifying the environment of the nanotubes and the history of that environment prior to and during the process. The materials and objects are "macroscopic" in that they are large enough to be seen without the aid of a microscope or of the dimensions of such objects. These macroscopic, ordered SWNT materials and objects have the remarkable physical, electrical, and chemical properties that SWNT exhibit on the microscopic scale because they are comprised nanotubes, each of which is aligned in the same direction and in contact with its nearest neighbors. An ordered assembly of closest SWNT also serves as a template for growth of more and larger ordered assemblies. An ordered assembly further serves as a foundation for post processing treatments that modify the assembly internally to specifically enhance selected material properties such as shear strength, tensile strength, compressive strength, toughness, electrical conductivity, and thermal conductivity.

19 Claims, 15 Drawing Sheets

OTHER PUBLICATIONS

Srivastava, et al., "Effect of external electric field on the growth of nanotubes," *Applied Physics Letters*, vol. 72, No. 14, Apr. 6, 1998, pp. 1685–1687.

Walters, et al., "In-plane aligned membranes of carbon nanotubes," *Chem. Phys. Lett.*, 338 (2001), pp. 14–20.

Yanagi, et al., "Self-orientation of short single-walled carbon nanotubes deposited on graphite," *Applied Physics Letters*, vol. 78, No. 10, Mar. 5, 2001, pp. 1355–1357.

Ajayan, et al., "Aligned Carbon Nanotube Arrays Formed Cutting a Polymer Resin–Nanotube Composite," *Science*, vol. 265, Issue 5176, Aug. 26, 1994, pp. 1212–1214.

* cited by examiner

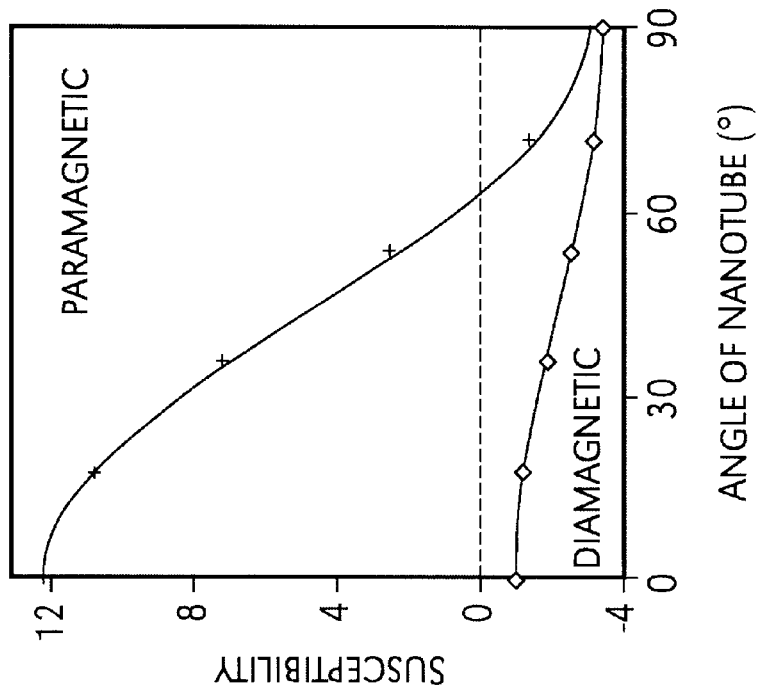
Fig. 1C
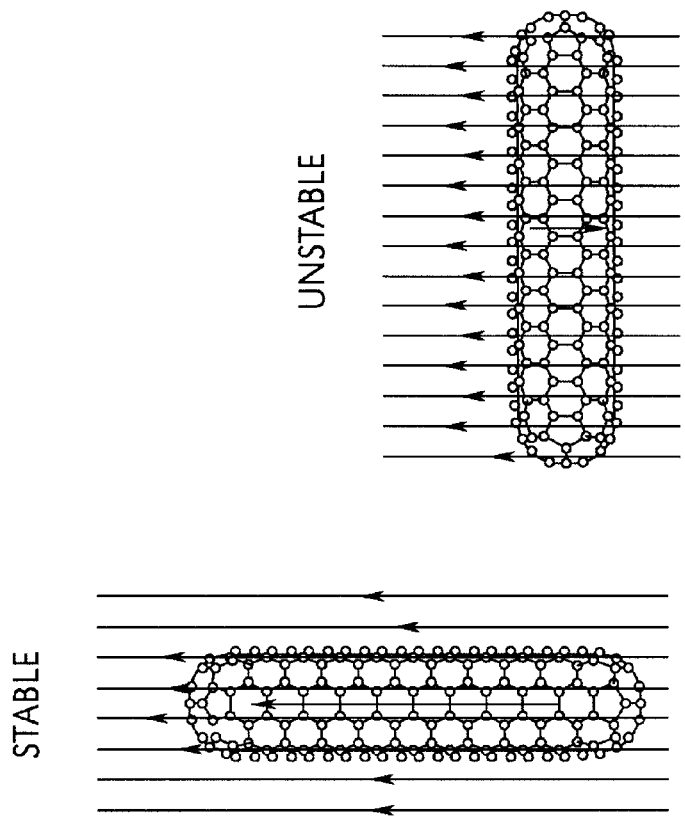
Fig. 1B
Fig. 1A

Acc. V   Spot  Magn     Det  WD ├─────────┤ 10μm
10.0 kV  3.0   2500x    SE   5.3  Hivac Acc. V   Spot  Magn     Det  WD ├─────────────┤10μm
10.0 kV  3.0   3500x    SE   5.2  Hivac Acc. V    Spot  Magn    Det  WD  |————————| 50μm
10.0 kV   3.0   500x    SE   5.4  Hivac Acc. V   Spot  Magn      Det  WD ⊢—————⊣100μm
30.0 kV  3.0   350x      SE   5.1  Hivac Acc. V   Spot  Magn      Det  WD ⊢———⊣ 500μm
30.0 kV  3.0   50000x    SE   10.8 Hivac

MACROSCOPIC ORDERED ASSEMBLY OF CARBON NANOTUBES

CROSS REFERENCE TO RELATED APPLICATIONS

This application is the 35 U.S.C. § 371 National Stage Application of International Application No. PCT/US00/29722 filed Oct. 27, 2000, which designated the United States, claiming priority to U.S. Provisional patent application Ser. No. 60/161,717 filed Oct. 27, 1999. Each of the foregoing Applications is commonly assigned to the Assignee of the present invention.

This invention was made with Government support under Grant No. NCC9-77 and Grant No. N00014-99-1-0246 awarded by the National Aeronautical and Space Administration and Office of Naval Research, respectively. The Government may have certain rights in the invention.

BACKGROUND OF THE INVENTION

Fullerenes are closed-cage molecules composed entirely of $sp^2$-hybridized carbons, arranged in hexagons and pentagons. Fullerenes (e.g., C60) were first identified as closed spheroidal cages produced by condensation from vaporized carbon.

Fullerene tubes are produced in carbon deposits on the cathode in carbon arc methods of producing spheroidal fullerenes from vaporized carbon. Ebbesen et al. (Ebbesen 1), "Large-Scale Synthesis Of Carbon Nanotubes," *Nature*, Vol. 358, p. 220 (Jul. 16, 1992) and Ebbesen et al., (Ebbesen II), "Carbon Nanotubes," *Annual Review of Materials Science*, Vol. 24, p. 235 (1994). Such tubes are referred to herein as carbon nanotubes. Many of the carbon nanotubes made by these processes were multi-wall nanotubes, i.e., the carbon nanotubes resembled concentric cylinders. Carbon nanotubes having up to seven walls have been described in the prior art. Ebbesen II; Iijima et al., "Helical Microtubules Of Graphitic Carbon," *Nature*, Vol. 354, p. 56 (Nov. 7, 1991).

In defining carbon nanotubes, it is helpful to use a recognized system of nomenclature. In this application, the carbon nanotube nomenclature described by M. S. Dresselhaus, G. Dresselhaus, and P. C. Eklund, *Science of Fullerenes and Carbon Nanotubes*, Chap. 19, especially pp. 756–760, (1996), published by Academic Press, 525 B Street, Suite 1900, San Diego, Calif. 92101-4495 or 6277 Sea Harbor Drive, Orlando, Fla. 32877 (ISBN 0-12-221820-5), which is hereby incorporated by reference, will be used. The single wall tubular fullerenes are distinguished from each other by double index (n,m) where n and m are integers that describe how to cut a single strip of hexagonal "chicken-wire" graphite so that its edges join seamlessly when it is wrapped onto the surface of a cylinder. When the two indices are the same, m=n, the resultant tube is said to be of the "arm-chair" (or n,n) type, since when the tube is cut perpendicular to the tube axis, only the sides of the hexagons are exposed and their pattern around the periphery of the tube edge resembles the arm and seat of an arm chair repeated n times. Arm-chair tubes are a preferred form of single-wall carbon nanotubes since they are metallic, and have extremely high electrical conductivity. In addition, all single-wall nanotubes have extremely high thermal conductivity and tensile strength.

Single-wall carbon nanotubes (SWNT) have been made in a DC arc discharge apparatus of the type used in fullerene production by simultaneously evaporating carbon and a small percentage of Group VIII transition metal from the anode of the arc discharge apparatus. See Iijima et al., "Single-Shell Carbon Nanotubes of 1 nm Diameter," *Nature*, Vol. 363, p.603 (1993); Bethune et al., "Cobalt Catalyzed Growth of Carbon Nanotubes with Single Atomic Layer Walls," *Nature*, Vol. 63, p. 605 (1993); Ajayan et al., "Growth Morphologies During Cobalt Catalyzed Single-Shell Carbon Nanotube Synthesis," *Chem. Phys. Lett.*, Vol. 215, p. 509 (1993); Zhou et al., "Single-Walled Carbon Nanotubes Growing Radially From $YC_2$ Particles," *Appl. Phys. Lett.*, Vol. 65, p.1593 (1994); Seraphin et al., "Single-Walled Tubes and Encapsulation of Nanocrystals Into Carbon Clusters," *Electrochem. Soc.*, Vol. 142, p. 290 (1995); Saito et al., "Carbon Nanocapsules Encaging Metals and Carbides," *J. Phys. Chem. Solids*, Vol. 54, p. 1849 (1993); Saito et al., "Extrusion of Single-Wall Carbon Nanotubes Via Formation of Small Particles Condensed Near an Evaporation Source," *Chem. Phys. Lett.*, Vol. 236, p. 419 (1995). It is also known that the use of mixtures of such transition metals can significantly enhance the yield of single-wall carbon nanotubes in the arc discharge apparatus. See Lambert et al., "Improving Conditions Toward Isolating Single-Shell Carbon Nanotubes," *Chem. Phys. Lett.*, Vol. 226, p. 364 (1994).

While this arc discharge process can produce single-wall nanotubes, the yield of nanotubes is low and the tubes exhibit significant variations in structure and size between individual tubes in the mixture. Individual carbon nanotubes are difficult to separate from the other reaction products and purify.

An improved method of producing single-wall nanotubes is described in U.S. patent application Ser. No. 08/687,665, entitled "Ropes of Single-Walled Carbon Nanotubes" incorporated herein by reference in its entirety. This method uses, inter alia, laser vaporization of a graphite substrate doped with transition metal atoms, preferably nickel, cobalt, or a mixture thereof, to produce single-wall carbon nanotubes in yields of at least 50% of the condensed carbon. The single-wall nanotubes produced by this method tend to be formed in clusters, termed "ropes," of 10 to 1000 single-wall carbon nanotubes in parallel alignment, held together by van der Waals forces in a closely packed triangular lattice. Nanotubes produced by this method vary in structure, although one structure tends to predominate.

PCT/US/98/04513 entitled "Carbon Fibers Formed From Single-Wall Carbon Nanotubes" and which is incorporated by reference, in its entirety, discloses, inter alia, methods for producing single-wall carbon nanotubes, nanotube ropes, nanotube fibers, and nanotube devices. A method for making single-wall carbon nanotubes is disclosed, in which a laser beam vaporizes material from a target comprising, consisting essentially of, or consisting of a mixture of carbon and one or more Group VI or Group VIII transition metals. The vapor from the target forms carbon nanotubes that are predominantly single-wall carbon nanotubes, and of those, the (10, 10) tube is predominant. The method also produces significant amounts of single-wall carbon nanotubes that are arranged as ropes, i.e., the single-wall carbon nanotubes run parallel to each other. The laser vaporization method provides several advantages over the arc discharge method of making carbon nanotubes: laser vaporization allows much greater control over the conditions favoring growth of single-wall carbon nanotubes and the laser vaporization method produces single-wall carbon nanotubes in higher yield and of better quality. The laser vaporization method may also be used to produce longer carbon nanotubes and longer ropes.

PCT US99/25702 entitled "Gas-phase process for production of single-wall carbon nanotubes from high pressure CO" and which is incorporated by reference, in its entirety, discloses, inter alia, methods for producing single-wall carbon nanotubes, nanotube ropes, nanotube fibers, and nanotube devices. A method for making single-wall carbon nanotubes is therein disclosed, which invention comprises the process of supplying high pressure (e.g., 30 atmospheres) CO that has been preheated (e.g., to about 1000° C.) and a catalyst precursor gas (e.g., $Fe(CO)_5$) in CO that is kept below the catalyst precursor decomposition temperature to a mixing zone. In this mixing zone, the catalyst precursor is rapidly heated to a temperature that results in (1) precursor decomposition, (2) formation of active catalyst metal atom clusters of the appropriate size, and (3) favorable growth of SWNTs on the catalyst clusters. Preferably a catalyst cluster nucleation agency is employed to enable rapid reaction of the catalyst precursor gas to form many small, active catalyst particles instead of a few large, inactive ones. Such nucleation agencies can include auxiliary metal precursors that cluster more rapidly than the primary catalyst, or through provision of additional energy inputs (e.g., from a pulsed or CW laser) directed precisely at the region where cluster formation is desired. Under these conditions SWNTs nucleate and grow according to the Boudouard reaction. The SWNTs thus formed may be recovered directly or passed through a growth and annealing zone maintained at an elevated temperature (e.g., 1000° C.) in which tubes may continue to grow and coalesce into ropes.

Carbon nanotubes, ropes of carbon nanotubes, and in particular, single-wall carbon nanotubes and ropes thereof, are useful for making electrical connectors in micro devices such as integrated circuits or in semiconductor chips used in computers because of the electrical conductivity and small size of the carbon nanotube. The carbon nanotubes are useful as antennas at optical frequencies, and as probes for scanning probe microscopy such as are used in scanning tunneling microscopes (STM) and atomic force microscopes (AFM). They are useful as electron field-emitters and as electrode materials, particularly in fuel cells andelectrochemical applications such as Lithium ion batteries. Carbon nanotubes may be used in place of or in conjunction with carbon black in tires for motor vehicles. The carbon nanotubes are also useful as supports for catalysts used in industrial and chemical processes such as hydrogenation, reforming and cracking catalysts. They are useful as elements of composite materials providing novel mechanical, electrical and thermal conductivity properties to those materials.

Ropes of single-wall carbon nanotubes are metallic, i.e., they will conduct electrical charges with a relatively low resistance. Ropes are useful in any application where an electrical conductor is needed, for example as an additive in electrically conductive paints or in polymer coatings or as the probing tip of an STM.

SUMMARY OF THE INVENTION

The present invention is directed to macroscopic materials and objects of aligned nanotubes and to the creation of such materials. The invention entails aligning single-wall carbon nanotube (SWNT) segments that are suspended in a fluid medium and then removing the aligned segments from suspension in a way that macroscopic, ordered assemblies of SWNT are formed.

The materials and objects are "macroscopic" in that they are large enough to be seen without the aid of a microscope, or have the physical dimensions of such objects. These macroscopic, ordered SWNT materials and objects have the remarkable physical, electrical, and chemical properties that SWNT exhibit on the microscopic scale because they are comprised of nanotubes, each of which is aligned in the same direction and in contact or close proximity with its nearest neighbors. An ordered assembly of SWNT also serves as a template for growth of more and larger ordered assemblies. This invention shows the first realized means of creating macroscopic objects of aligned SWNT. These materials and objects are highly anisotropic: each of their physical properties such as electrical conductivity, thermal conductivity, tensile strength, compressive strength, resistance to fracture, etc. are dependent on the direction in which each of these properties is measured with respect to the direction of orientation of the SWNT in the object. The thermal conductivity, for instance, parallel to the direction of the SWNT in the object will be substantially different from the thermal conductivity in the direction perpendicular to the SWNT. In the following, any reference to physical properties is understood to refer to quantities that are anisotropic and appropriately described in the direction-dependent representations known to those skilled in the art.

According to one embodiment of the present invention, a single strand comprising millions of SWNT is disclosed. According to another embodiment of the present invention, a new material made of aligned single-wall carbon nanotubes is realized. This material is a thin (approx. 1.5 $\mu m$ thick) membrane having about $10^{14}$ individual nanotubes per $cm^2$ oriented in the same direction, and lying in the plane of the membrane. This "in-plane membrane" represents a new material, and is the first example of a macroscopic ordered assembly of carbon nanotubes.

According to another embodiment of the present invention, a method for alignment is disclosed. Electric fields, magnetic fields, and shear flow fields are known to apply forces to SWNT, and can be used to achieve alignment of SWNT segments suspended in liquids. One method involves applying the magnetic field to a suspension of SWNT segments, which are typically 200–1000 nanometers long. The interaction of the magnetic field with the SWNT segments causes a high degree of alignment of the individual segments in a direction parallel to the magnetic field. Once the segments are aligned, assembly of larger objects is achieved by enabling these aligned SWNT to come out of suspension and aggregate while they remain aligned by the magnetic field.

As the nanotube segments are removed from suspension, they adhere to one another in arrays wherein the tube segments lie essentially parallel to one another and each tube segment is in contact with its nearest neighbors. This proclivity of nanotube segments for self-assembly into small ordered structures has been known for several years. These small structures are often called "ropes", and typically have cross sections comprising between 10 and 1000 individual tubes. Ropes form naturally in all known production methods for SWNT and they appear in the solid residues from filtration or centrifugation of suspensions of SWNT segments in liquids.

This "roping" of SWNT happens in collisions and subsequent interaction of individual SWNT with one another, in interactions between individual SWNT and ropes that have already formed, or in interactions between ropes. "Roping" occurs because SWNT are exceedingly stiff molecules. The bare walls of SWNT have a strong van der Waals attraction for one another, and the tubes aggregate very easily. SWNT suspended in a liquid are mobile, and will move in a way consistent with well-known principles of physics. When two such stiff objects with attractive forces between their sides encounter one another, if they are free to rotate, they will reorient to the most energetically-favored arrangement, which is to lie together in such a way that there is a maximal contact surface area between the two entities. As long as the forces between the sides of the stiff objects are attractive, the condition of maximal surface contact is the condition of minimum energy for the system. Likewise, an individual tube segment aggregating with a "rope" will align with the long axis of the rope, and lie so that it contacts two other tubes in the rope. When rope segments aggregate, they will rearrange themselves into a single rope of larger cross section, in a way that the energy of the structure so formed is minimized.

A further novel property of SWNT is that their surfaces are relatively smooth on an atomic scale, and there is little resistance to a motion in which one tube "slides" in a direction parallel to its nearest neighbor. Thus as the rope forms, its constituent nanotube segments will further rearrange their displacements parallel to the axis of the forming rope in a way that minimizes energy. As indicated above, this minimization of energy occurs when the contact area between adjacent tubes is maximized, thus minimizing the exposed tube surface area. This principle dictates that as the rope forms, individual SWNT segments pack tightly, with the end of each segment in close proximity to the end of its nearest neighbor that lies along essentially the same axis. If the individual nanotube segments remain sufficiently mobile, as small ropes aggregate to form larger ropes, a similar repacking to minimize energy will take place, ensuring that the larger ropes are closely-packed with a minimum of voids inside.

Obviously, since "roping" depends on physical interactions of distinct SWNT or ropes, the rate of the "roping" process depends on the local concentration of nanotube material. If the local concentration of nanotube material is increased, roping proceeds more rapidly. The progress of the roping process, and the ultimate product can be controlled by modifying the environment of the nanotubes and the history of that environment prior to and during the roping process. An important aspect of this invention is to provide means of said modifications to exploit and control the "roping" behavior of SWNT to produce novel materials and objects comprising SWNT.

SWNT are highly anisotropic, and have remarkable physical properties. Likewise, a material that comprises highly-oriented SWNT, all arranged in the same direction will have remarkable properties. This invention presents the first realization of such material, means for producing such material and objects made from it, and several applications of this new composition of matter.

This invention first comprises the modification of the roping process by chemical means, wherein the diameter of the ropes formed is increased well beyond that known in the art. The larger ropes themselves form novel materials and objects.

If individual mobile tubes or rope segments are aligned by some means (electric, magnetic, shear, etc.), prior to or during the "roping" process they will form aligned ropes, which will then interact to form larger ropes. One aspect of this invention is to effect an alignment of the individual tube segments or small "ropes" that enables their self-assembly on a larger scale that forms manipulable, macroscopic structures and materials. The invention also comprises the materials of highly-aligned SWNT segments and ropes of SWNT segments exemplified by the product of the demonstrated process, and it also includes electrical, chemical, mechanical, and biological applications of macroscopic ordered nanotube materials and objects.

The invention also comprises post-processing of said macroscopic ordered nanotube materials and objects in ways that are enabled by their ordered arrangement. This post-processing enhances the properties of said materials and objects by, for instance, by modifying their mechanical properties, electrical conductivity, thermal conductivity, and interaction with electromagnetic radiation. Such post-processing includes methods and techniques of joining the ends or sides of the nanotube segments that make up the macroscopic ordered material or object.

The ordered composition itself enables such post processing by maintaining the relative positions of interacting tube segments during the time required for interactions that comprise the post-process. The ordered assembly clearly holds the sides of individual nanotubes in contact with the sides of its nearest neighbors. Less obvious is that the efficient packing of nanotube segments as they aggregate during the formation process for the macroscopic ordered material or object also causes the ends of adjacent, co-linear nanotube segments to touch or be in very close proximity to one another. The ordered arrangement of the nanotube segments in the said material or object holds the adjacent nanotube segment ends in close proximity, enabling a post-processing step.

A simple example of such post processing is to introduce an agent or combination of agents that induce cross-linking between the sides of the tubes as they lie parallel to one another. Such agents include chemical ones that intercalate the ordered material and bond chemically to adjacent tubes, and a combination of radiation (photons, x-rays, gamma rays, and/or energetic ions, electrons or neutrons) and heat wherein the radiation causes dislocations in the regular tube sidewalls, and the heat enables rearrangements of the tube sidewalls in which bonds form between the wall of one tube segment and the wall of an adjacent tube segment. Said cross linking would materially alter the properties of the material or object by changing its shear strength, tensile strength, toughness, electrical conductivity and thermal conductivity.

Another example of such post-processing comprises application of heat, annealing of a macroscopic ordered nanotube material or object in such a way that the ends of essentially-collinearly-arranged and abutting nanotube segments rearrange their chemical bonding so that the segments become substantially joined by covalent bonds. This "welding together" of individual nanotube segments at or near their ends within a macroscopic ordered material or object will alter and improve one or more components of the mechanical properties, electrical properties and thermal properties of the that material. For instance, the tensile strength, electrical conductivity and thermal conductivity of the material in the direction parallel to the tube axes are all increased by the "welding together" of SWNT segments in the macroscopic ordered nanotube material. The ordered materials produced by this invention have a number of useful forms. They are presented as solid objects, films, and fibers. The unique "roping" behavior of SWNT and the control of that behavior disclosed herein also enable them to form sparse networks that are mechanically and electrically continuous. These networks, by themselves, or as elements of composite materials, enable creation of conductive polymers and films for management of electron flow in and around otherwise-electrically-insulating materials and structures.

It is a technical advantage of the present invention that a method for chemical manipulation of single-wall carbon nanotubes that enables production of large ropes and a macroscopic ordered assembly of carbon nanotubes is disclosed.

It is technical advantage of the present invention that a method for magnetic manipulation of single-wall carbon nanotubes and ropes is disclosed It is a technical advantage of the present invention that methods for producing a macroscopic ordered assembly of carbon nanotubes are disclosed. It is a technical advantage of the present invention that methods for post processing a macroscopic ordered assembly of carbon nanotubes that modify the properties of said assembly and are fundamentally enabled by the assembly's structure are disclosed.

The foregoing objectives, the compositions of matter produced by them and other objectives apparent to those skilled in the art, are achieved according to the present invention as described and claimed herein.

The ordered assemblies also are important in their service as a substrate for initiation of growth of more and larger ordered assemblies of nanotubes. Here, the ordered assembly is cut in a direction perpendicular to that of the tube axes. The exposed surface is then cleaned and made uniform using electrochemical polishing or other means known to those skilled in the art of surface science. A transition metal catalyst is placed on or near the open tube ends., The catalyst is either in the form of metal deposited by a known means or pre-formed metal clusters with attached chemical moieties that enable of the clusters to communicate with and join with the open tube ends. This assembly is then exposed to a growth environment. One such environment is 30 atmospheres of CO at a temperature of approximately 1000° C. The catalyst metal becomes mobile at elevated temperatures and forms small clusters on the open tube ends, and the individual tubes begin growing in an ordered array of the same tube type, diameter, and spacing as the original substrate array. This process enables assembly of fibers, cables, and structural materials that will be more than an order of magnitude stronger than any others that can now be produced. The materials may be used to produce structural sections such as I-beams, composite structures, electrodes, structural and/or active parts of batteries, armor and other protective materials, thermal management structures or devices, and structures or devices that reflect, absorb or modify electromagnetic radiation impinging upon them.

The methods of the present invention are fundamentally enabling in both the assembly of "seed arrays" for further nanotube growth, particularly for growth of additional macroscopic, ordered nanotube materials and structures.

BRIEF DESCRIPTION OF THE DRAWINGS

FIGS. 1(a)–(c) are a schematic illustration of the physical principles that cause both metallic (n,n) and non-metallic SWNT segments suspended in a liquid to align in a strong magnetic field according to one embodiment of the present invention.

DETAILED DESCRIPTION OF THE PREFERRED EMBODIMENTS

Figure 2:
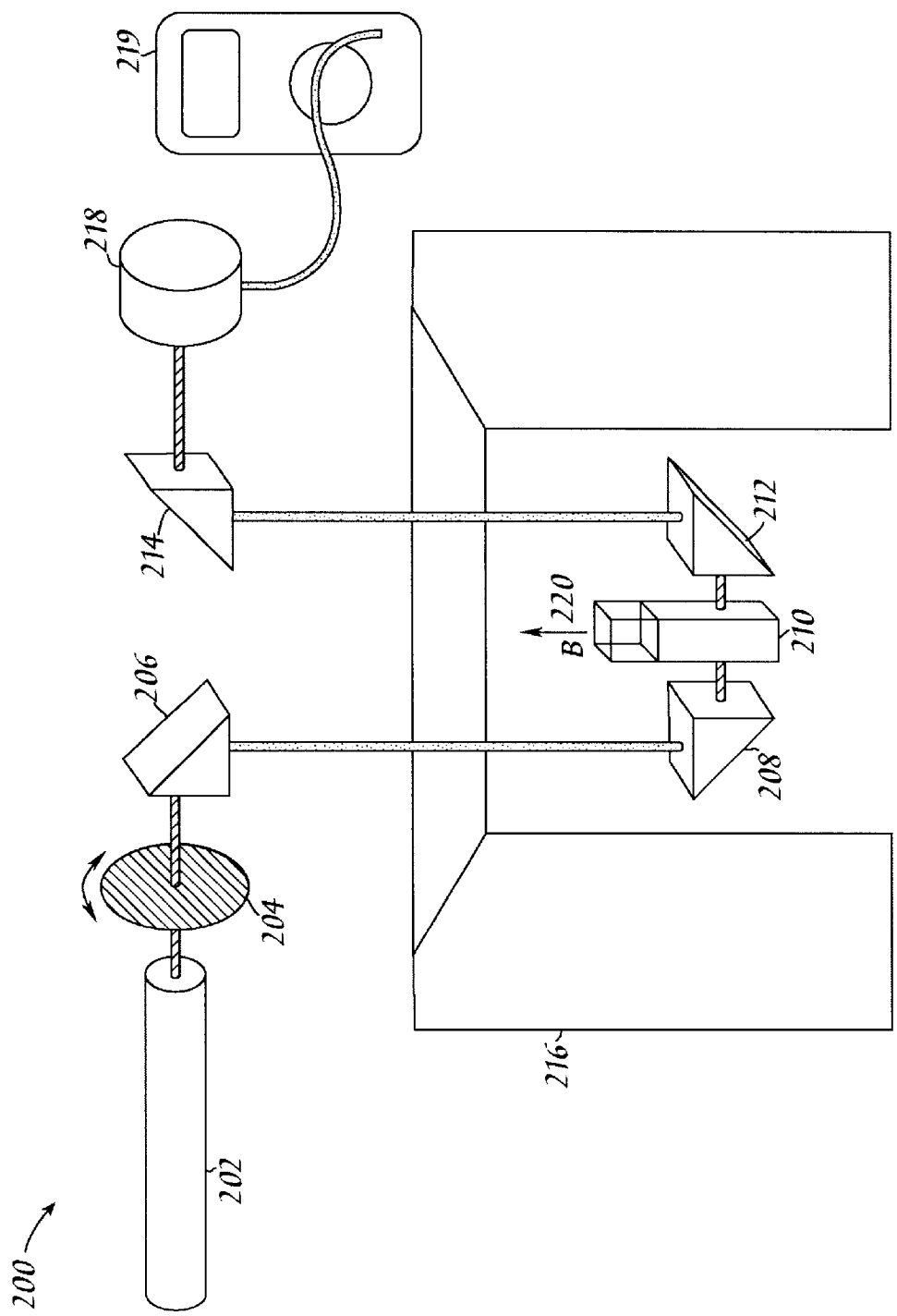
FIG. 2 is an apparatus for determining the alignment of SWNT'segments suspended in a liquid placed in a magnetic field according to one embodiment of the present invention.

Carbon has, from its very essence, not only the propensity to self-assemble from a high temperature vapor to form perfect spheroidal closed cages (of which $C_{60}$ is prototypical), but also (with the aid of a transition metal catalyst) to assemble into single-wall cylindrical tubes which may be sealed at both ends with a semi-fullerene dome or may be open at one or both ends. These tubes are true fullerene molecules.

This invention involves alignment of SWNT by some means and assembly of these aligned nanotubes into a macroscopic ordered assembly comprising SWNT. SWNTs have been found to orient lengthwise in response to chemical forces between bare or derivatized tube walls, electric fields, magnetic fields, and shear flow fields. This invention includes creation of macroscopic ordered nanotube materials and objects, wherein the necessary alignment of SWNT is provided by each of these types of forces. A preferred embodiment includes use of magnetic fields for alignment, and is described here in detail.

Referring to FIG. 1(a), a paramagnetic SWNT that is oriented lengthwise in the direction of a magnetic field is stable. In FIG. 1(b), a diamagnetic SWNT that has its length perpendicular to the magnetic field is unstable, and, if free to move will also orient itself to be parallel to the field. A graph of the susceptibility of paramagnetic and diamagnetic SWNTs versus the angle of the SWNT relative to the magnetic field is provided in FIG. 1(c). Metallic [(n,m) where 2n+m=3q, where q is an integer] tubes are paramagnetic, and their paramagnetic susceptibility is maximum when the magnetic field is aligned parallel to the tube axis. Thus metallic tubes will align with a magnetic field. SWNTs that are not metallic are semiconducting, and these semiconducting tubes are diamagnetic. The diamagnetic tubes have their most negative diamagnetic susceptibility when the tube is oriented perpendicular to the ambient magnetic field, indicating that the minimum-energy alignment of the diamagnetic tubes in a magnetic field is also parallel to the field axis. While nanotubes are highly electrically polarizable and can be oriented by electric fields, orientation by magnetic fields is particularly useful because, unlike electric fields, magnetic fields are not screened by mobile charges, and therefore penetrate most materials relatively easily. See J. P. Lu, "Novel Magnetic Properties of Carbon Nanotubes" *Phys. Rev. Let.* 74, 1123 (1995); H. Ajiki and T. Ando "Magnetic Properties of Carbon Nanotubes" *J. Phys. Soc. Jpn.* 62, 2470 (1993), both of which are incorporated by reference in their entireties.

The alignment energy of the SWNT in the magnetic field ($\Delta U$) is the difference in energy between a configuration in which a SWNT segment is aligned parallel to the magnetic field B and the configuration in which it is aligned perpendicular to B. In order for an individual SWNT segment to have a substantial average alignment with respect to the direction of B $\Delta U$ must be greater than the thermal energy kT, (where T is the absolute temperature and k is the Boltzmann constant) associated with the SWNT segment's rotation in directions perpendicular to the magnetic field. $\Delta U$ increases with the total mass of the tube, the susceptibility of the tube, and the value of the magnetic field. At a given temperature, with a low magnetic field strength, or short SWNT, its thermal motion will determine the tube segment's motion and there will be less SWNT alignment. If there is a large magnetic field, or long SWNT ropes, there will be good SWNT alignment. Typically, for alignment energies ($\Delta U$) of less than 5 kT, there will not be significant SWNT alignment. Even at an energy ($\Delta U$) of 50 kT, however, there will still be about a ±15° difference in average SWNT alignment from the direction of the magnetic field. Likewise, an aggregation of nanotubes with their axes parallel, such as a short "rope" of nanotubes ("Crystalline Ropes of Metallic Carbon Nanotubes," A. Thess, R. Lee, P. Nikolaev, H. J. Dai, P. Petit, J. Robert, C. H. Xu, Y. H. Lee, S. G. Kim, A. G. Rinzler, D. T. Colbert, G. E. Scuseria, D. Tomanek, J. E. Fischer and R. E. Smalley, *Science*, 273, 483 (1996)) is also subject to orientation by a magnetic or electric field. In the case where the sample contains suspended ropes, however, the magnetic field is particularly effective, because the alignment energy, $\Delta U$, increases with the total mass of the linear object being aligned by the field.

Magnetic fields are typically developed by a permanent magnet, an electromagnet, a superconducting electromagnet or generally, electrical current flowing in a conductive structure. The requisite strength of the magnetic field to achieve alignment of individual nanotubes or nanotube rope segments depends on factors, including, inter alia, the length and characteristics of the SWNT or rope segment. As discussed above, $\Delta U$ depends on the mass, and alignment of short SWNTs requires stronger magnetic fields than alignment of longer tubes or ropes of SWNTs. For example, for a (10,10) SWNT 300 nm in length, a 15.3 T magnetic field must be used to achieve a $\Delta U$ of 5 kT and cause alignment. For a SWNT rope 10 nm in diameter (about 50 SWNT) and 3 $\mu$m in length, however, a 0.68 T field must be used.

Once individual suspended and mobile SWNT are aligned in a magnetic field, the aligned SWNT will, at sufficiently high SWNT concentrations, group together in bundles, forming aligned ropes of SWNT, and ropes will group together to form aligned ropes of larger diameter. SWNT or rope alignment in a suspension may be detected using an apparatus such as that shown in FIG. 2. Referring to FIG. 2, apparatus 200 includes laser 202, half-wave plate 204, right angle prisms 206, 208, 212, and 214, cuvette 210, magnet 216, photodiode 218, and meter 220. Cuvette 210 contains SWNT segments suspended in the solvent dimethylformamide. Magnet 216 generates a magnetic field to which the SWNT in cuvette 210 are subjected. Magnet 216 may be a permanent magnet, an electromagnet, or a superconducting electromagnet. In one embodiment, the intensity of the magnetic field produced by magnet 216 may be variable.

To determine the alignment of the SWNT segments and ropes, laser 202 (such as a HeNe laser) produces a polarized light beam, which passes through half-wave plate 204. Rotation of the half-wave plate about an axis parallel to the laser beam rotates the orientation of the polarization vector of the beam emerging from the half-wave plate. Thus by choosing the orientation of the half-wave plate, one specifies the orientation of the beam's polarization with respect to the magnetic field 220 The after reflection, the laser beam travels through the suspension in cuvette 210, and is reflected to photodiode 218, where the amount of laser light reaching photodiode 218 is measured as a function of the light polarization direction with respect to that of the magnetic field.

The light signal reaching photodiode 218 is a maximum when the laser light polarization is perpendicular to the magnetic field, and is a minimum when the light polarization is parallel to the magnetic field. This variation of laser light transmission with its polarization is clearly more pronounced at larger magnetic fields. The linear structure of the individual SWNT segments and ropes ensures that their scattering of polarized light is a function of the angle between their axes and the polarization vector of the incident light. The observed variation of the sample's transmission as a function of polarization direction and magnetic field both indicate that the SWNT are becoming highly aligned in strong magnetic fields.

If the SWNT and ropes remain suspended, they will return to random orientations once the magnetic field is removed. Several processes and apparatuses are disclosed, that enable the SWNT and ropes to self-assemble into macroscopic ordered structures 1. Processes a. Process SWNT with oleum and extrusion of aligned fibers.

Prolonged exposure of small diameter SWNT ropes (diameters <5 nm) to hot fuming sulfuric acid (oleum) at elevated temperatures has been shown to produce super-ropes with approximately 10,000 tubes in cross-section. Examination of the optical spectral (ultraviolet, visible and Raman) of the roped SWNTs removed from the sulfuric acid indicates that the roping occurs without permanent alteration the chemical state of the nanotubes. Previously-observed ropes of SWNT material typically have 100–1000 tubes in ropes, and suspensions of such nanotubes readily make papers that can easily be peeled off a filter. ("Large-scale purification of single-wall carbon nanotubes: process, product and characterization," A. G. Rinzier, J. Liu, H. Dai, P. Nikolaev, C. B. Huffman, F. J. Rodriguez-Macias, P. J. Boul, A. H. Lu, D. Heymann, D. T. Colbert, R. S. Lee, J. E. Fischer, A. M. Rao, P. C. Eklund, R. E. Smalley, *Applied Physics A*, 67, 29 (1998)).

When oleum-treated SWNT material is removed from suspension, filtered and dried, very large ropes of 0.1 μm diameter are observed. Sulfuric acid intercalation of the ropes, and protonation of the side-walls of the SWNT segments and ropes occurs via their interaction with the intercalated sulfuric acid. The intercalant physically separates SWNT segments in suspension and protonation of the sidewalls mitigates the attractive van der Waals force between walls of neighboring SWNT and ropes. Both effects increase the mobility of individual SWNT segments, and small ropes and the constituent SWNT segments in ropes. During the "roping" process, this increased mobility enables the formation of ordered "super-ropes" of SWNT which are themselves a fraction of a micron in dimension as shown in FIG. 15.

Figure 15:
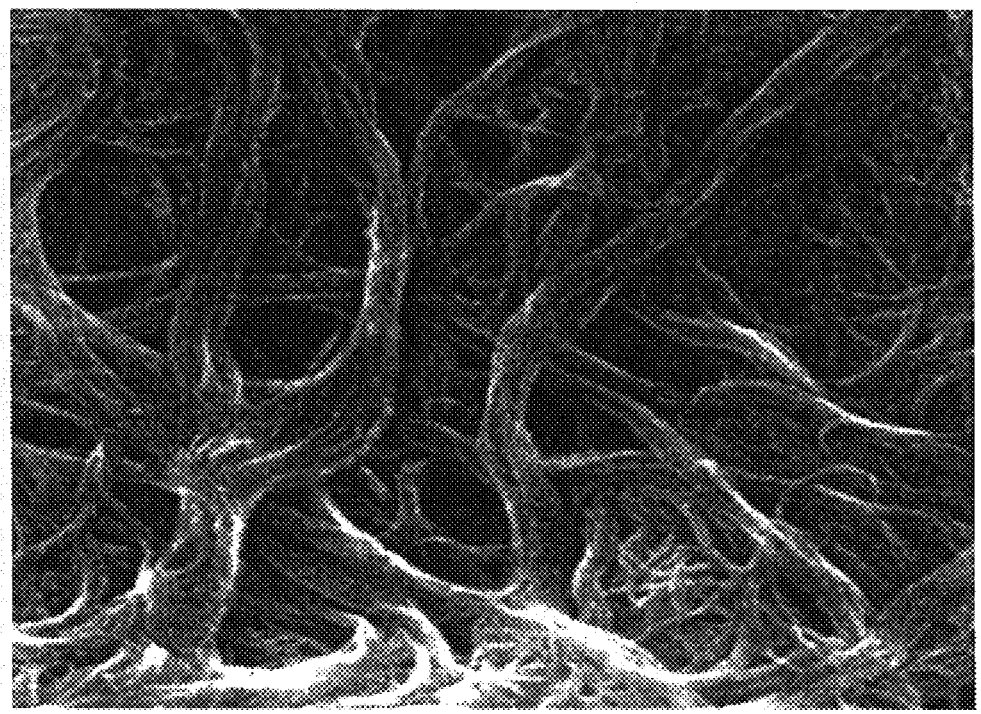
FIG. 15 is a scanning electron micrograph showing large (0.1 $\mu$m) ropes formed by processing SWNT in oleum according to one embodiment of the present invention.

To produce the filter cake (buckypaper) shown in FIG. 15, four hundred milligrams of as-produced SWNT from the high-pressure CO process ("Gas-phase Catalytic Growth of Single-Walled Carbon Nanotubes from Carbon Monoxide," P. Nikolaev, M. J. Bronikowski, R. K. Bradley, F. Rohmund, D. T. Colbert, K. A. Smith, and R. E. Smalley, Chemical Physics Letters, 313, 91 (1999). ) were added to a 250 ml round bottomed flask equipped with a condenser and magnetic stirrer. Fuming sulfuric acid (125 ml, 27–33% free $SO_3$) was added to the flask and stirred. After mixing was complete, the paste was thick and difficult to stir at room temperature. The paste was subsequently heated to 90° C. and stirred for 48 hours. The cooled contents of the flask were added dropwise to ether (500 ml) cooled in an ice bath with vigorous stirring. This was allowed to sit for 15 minutes and then filtered through a PTFE (0.5 micron) filter paper. The SWNTs where again suspended in acetonitrile/ether (50:50, 250 ml), sonicated for 15 min and recovered by filtration. The fuming sulfuric acid processed SWNT material easily forms a defined filtrate paper shown in FIG. 15, which is quite robust. Other acids that are known to intercalate graphite will also facilitate the formation of super-ropes.

Facilitating the movement of SWNTs and ropes in a hot oleum creates highly aligned SWNT fibers and membranes. For instance, the growth of large ropes in the presence of aligning forces such as occur in high magnetic fields leads to better alignment of SWNT within fibers and membranes that are formed in the presence of the field.

Figure 16:
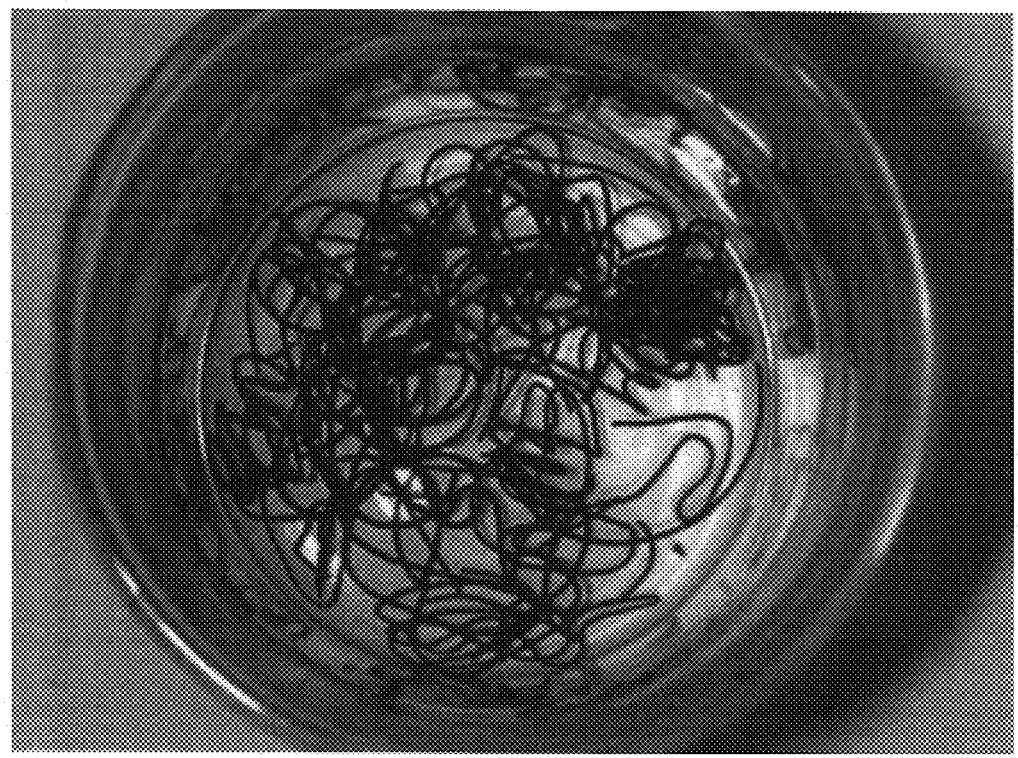
FIG. 16 is a photograph of a fiber comprising nanotubes aligned by shear forces in spinning and drawing.

When high concentrations of SWNT in oleum (pastes) are extruded through an orifice into water, the oleum dissolves rapidly in the water, leaving well-formed fibers of SWNT material. Shear forces in the extrusion process orient the SWNT, and orientation of the SWNT relative to the fiber axis is observed through analysis by polarized Raman spectroscopy. The fibers after extrusion into water are shown in FIG. 16.

b. Apply Magnetic Field, Add $MgCl_2$

According to another embodiment of the present invention, a process for assembling SWNT segments (of about 100–1000 nm in length) into arrays in which all tubes are substantially aligned is disclosed. These arrays may take the form of a thin membrane of substantially aligned SWNT oriented perpendicular to the plane of the membrane, or may take the form of a membrane of parallel SWNT segments having their axes lying in the plane of the membrane.

The properties of both bare and chemically-derivatized SWNT permit them to be highly aligned in a magnetic field. (This derivitization may be through covalent bonding of atoms or molecules to the sides and/or ends of the nanotubes or may be non-covalent, such as is provided by the interaction polymers with the sidewalls of the SWNT.) This large degree of alignment greatly simplifies the process of assembly of both thin membranes of substantially parallel tubes oriented perpendicular to the plane of the membrane, and greatly facilitates the formation of fibers of parallel tubes.

The process, according to one embodiment of the present invention, includes the following. First, a suspension of SWNT in a suspending agent is provided. DMF (dimethylformamide) is an example of a suitable suspending agent, in which the nanotubes suspend as colloidal particles with a known electrical charge per unit length. In one embodiment, about 20–30 mg/l of SWNT is in solution.

Another suitable suspending agent is a water-Triton X solution. Suspension of the SWNT is accomplished by addition of SWNT material to the solution and sonicating the mixture until a stable suspension is achieved. The suspension of SWNT may then placed in a magnetic field, where the SWNTs substantially align, as discussed above.

The magnetic field may range in intensity from about 0.5 T to over 30 T. In one embodiment, the magnetic field has a magnitude of about 25 T. Adding an ionic salt alters the stability of a colloidal suspension. In one embodiment, $MgCl_2$ is added to the suspension to add ions ($Mg^{+2}$ and Cl), which reduce the ability of the solution to suspend the SWNT. The $MgCl_2$ may be provided gradually to the suspension to enable the orderly "roping" of the SWNT segments as they "salt out" of suspension. This process of coagulation by electrolyte addition to a colloidal suspension is well known to those skilled in the art of colloids. Once out of solution, the SWNT precipitate to the bottom of the container, where they may then be collected.

The aligned SWNT may also form bundles of aligned SWNTs, also known as "ropes". As SWNTs are added to the bundles, the bundles will become heavier, and descend to the bottom of the container.

In another embodiment, electrodes are provided to alter the ability of the suspending agent to suspend the aligned SWNT. As above, the SWNT may be aligned in a magnetic field, and then electrical current is passed through the suspension (from electrodes immersed in the suspension), reducing the ability of the suspending agent to suspend the tubes. As the aligned tube segments come out of suspension, they remain aligned by the magnetic field and assemble into ordered structures.

c. Filter Method

According to another embodiment of the present invention, an ordered assembly of nanotubes aligned in suspension may be produced by filtering a suspension of SWNT while it remains in a magnetic field. SWNT are suspended in an appropriate solution (such as Triton-X and water). The SWNT may then be forced to flow through a magnetic field, where they substantially align, as discussed above. The SWNT, suspended in a moving solution, continue to move in the direction of solution flow, as they continue to flow under the influence of the magnetic field. The SWNT are then be "caught" on a screen element, which is also in the magnetic field, such as a syringe filter, which has pores that are sized such that the aligned SWNT cannot pass through. As the solution continues to flow, additional aligned SWNT continue to "build" on the screen element, forming a material of aligned SWNT.

Figure 3:
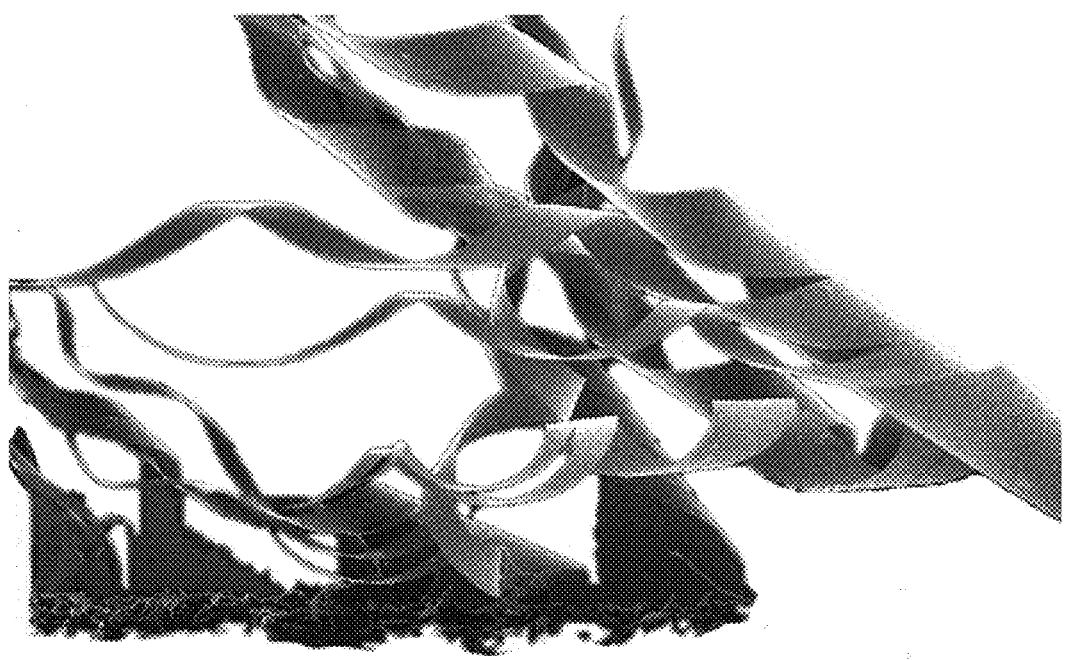
FIG. 3 is an electron micrograph of a portion of a macroscopic ordered assembly of carbon nanotubes according to one embodiment of the present invention.

The material of aligned SWNT is further processed by rinsing with a suitable solvent (such as isopropyl alcohol) and then dried. The membrane of aligned SWNT may then be removed from the screen element. The rinsing and drying process removes the suspending agent and allows the SWNT to come into intimate contact with one another, establishing strong van der Walls contact between parallel tubes. Further ordering and establishing of van der Waals contact between parallel tubes is achieved by annealing the membrane in an inert atmosphere at temperatures between 200° C. and 1300° C., most preferably temperatures between 900° C. and 1200° C. Membranes that are over one micron thick and one square centimeter in area, composed almost exclusively of SWNT segments aligned in the same direction, have been produced by this method. An example of a membrane produced by such a process is provided in FIG. 3.

In one embodiment, the membrane may be turned on its side so that the ends of the SWNT segments are exposed. In another embodiment, the membrane may be kept on its side with the tubes oriented in the plane of the surface upon which they were formed. The membrane may then be folded over one or more times with the folds creases in a direction perpendicular to the tube alignment direction, forming a thicker membrane. The individual membrane or the multiple-layer membrane serve as templates for further growth of macroscopic ordered assemblies of SWNT in a process where the membrane is cut in a direction perpendicular to the SWNT segments axes, processed to provide a regular surface of open tube ends (e.g., by electropolishing) and deposition of transition metal catalyst atoms or particles on or near the open tube ends. Further processing of this cut ribbon with catalyst enables formation of active catalyst particles on the open tube ends and exposure to an appropriate carbon containing feed stock (e.g., CO) at an appropriate temperature and pressure (ca 800–1200° C. at pressures of 1 to 100 atmospheres) re-starts the growth of the exposed tube ends. In this way a larger, macroscopic, ordered assembly of SWNT is grown. Each individual tube in the grown assembly will have the same diameter and tube type as the tube from which it began, but unlike those in the template, the tubes in the grown assembly will be continuous, instead of being short segments.

d. Three Dimensional SWNT Formation on Gold

In one embodiment, magnetically-aligned, derivatized SWNT are assembled on a gold substrate. In one embodiment, SWNT segments are derivatized at their ends with alkane thiols so that the sulfur-containing group of the thiol is at the end of the alkane chain opposite to the end at which it is attached to the SWNT. The sulfur atom readily attaches to a gold substrate, anchoring the tube there. This derivatization process and the ability of the so-derivatized tubes to attach to a gold substrate are known ( see "Fullerene Pipes," J. Liu, A. Rinzler, H. Dai, J. Hafner, R. Bradley, A. Lu, K. Shelimov, C. Huffman, F. Rodriguez-Macias, P. Boul, T. Iverson, D. T. Colbert, R. E. Smalley, *Science*, 280, 1253 (1998)). The invention here is to align derivatized tubes, and to form ordered assemblies through the action of tubes together with the derivatizing agents.

In one embodiment, SWNT end-derivatized with alkane thiols form a monolayer on the surface of a gold substrate. This self-assembled monolayer forms in a magnetic field containing a suspension of thiol-derivatized SWNT and a gold substrate lying with its face perpendicular to the magnetic field. The derivatized SWNT are aligned by the magnetic field so that the tube axes are perpendicular to the gold surface, and their diffusion in the suspension ultimately brings the thiol derivative into contact with the gold, whereupon there is a probability that the tube segment will become anchored to the gold by chemical interaction of the thiol and gold surface. Over time, a "bed of nails" membrane consisting of a self-assembled monolayer of SWNT segments essentially perpendicular to and attached at one end to the gold surface is formed. The magnetic field is a critical factor in maintaining the alignment of the SWNT segments during the membrane formation. The aligned membrane is removed from the field after it is formed In other embodiments, the SWNT are suspended in DMF, water and a surfactant such as Triton-X. Suspension of the SWNT in water is also enabled by non-covalent derivatization of the SWNT with such moieties as L-D peptide chains or polymers like polystyrene that wrap around the circumference of the tubes. Such non-covalent derivatizations essentially do not disturb the electronic or magnetic characteristics of the SWNT in any way, and allow them to be easily oriented by Magnetic fields. These "super surfactants" do, however, reduce the attractive forces between SWNT side walls and allow much more concentrated suspensions of SWNT than other surfactants, and thusly facilitate assembly of ordered assemblies of SWNT. This facilitation is in part due reduction of the forces between the tube walls, and in part due to forces between said "super surfactants" residing on one tube and those residing on another.

e. Formation of Three-Dimensional Structures

Figure 4A:
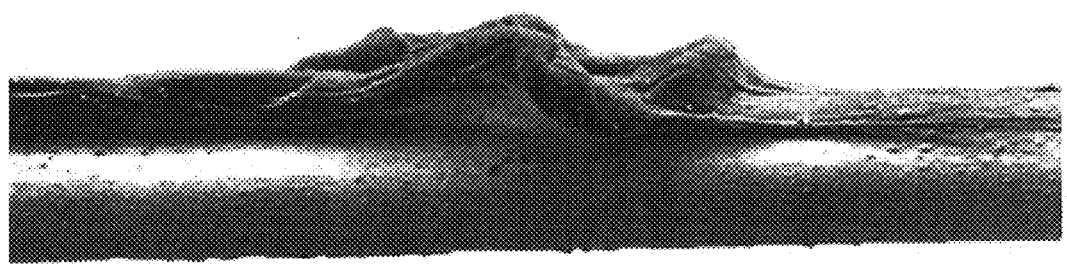
FIGS. 4(a)–(f) are TEM micrographs of Field-aligned SWNT assembled into three-dimensional structures in which the tubes are aligned substantially parallel to each other according to several embodiments of the present invention.
Figure 4B:
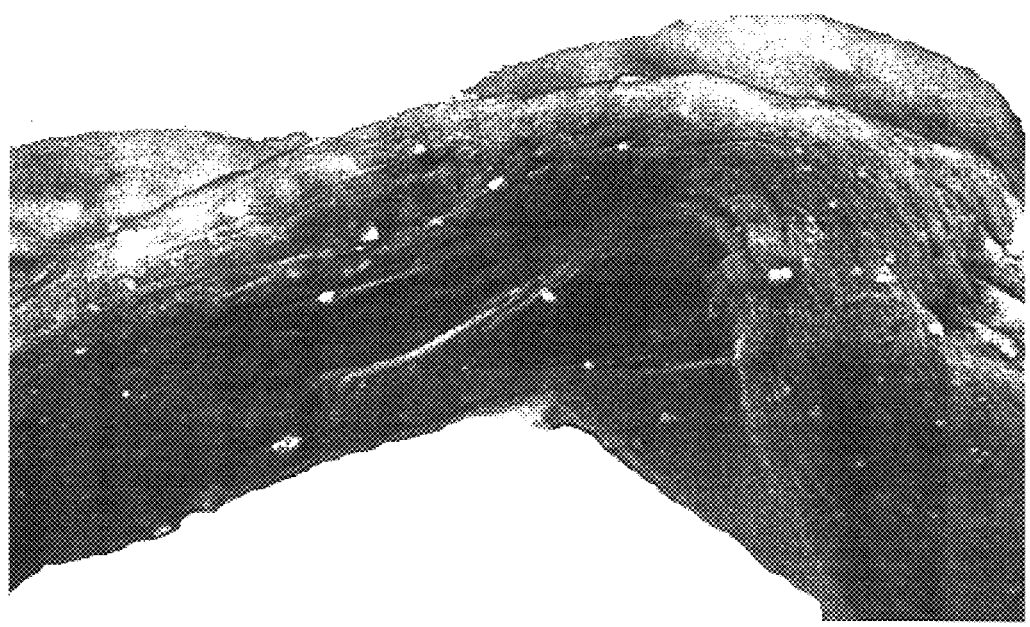
Figure 4C:
Figure 4D:
Figure 4E:
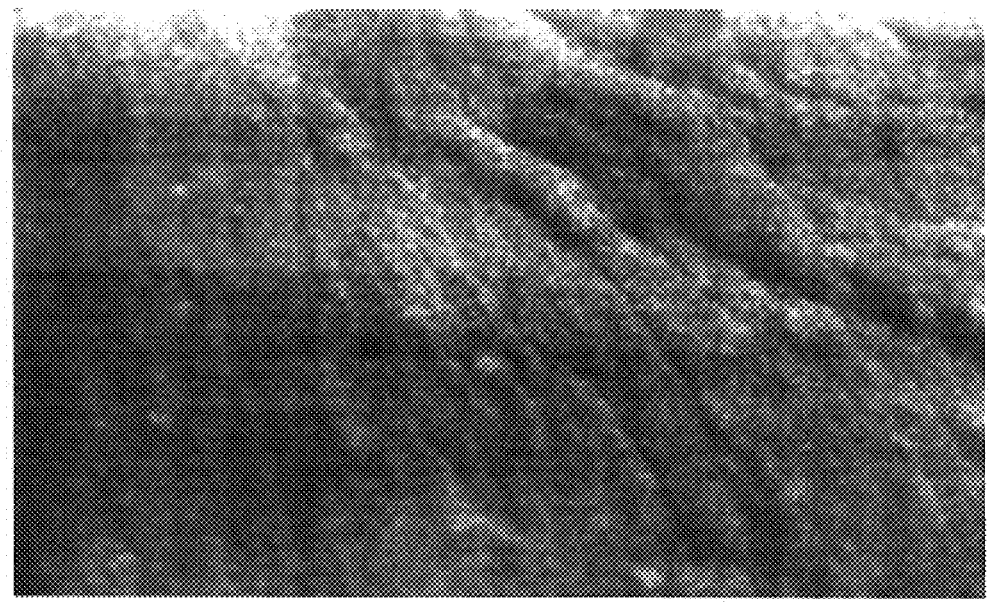
Figure 4F:
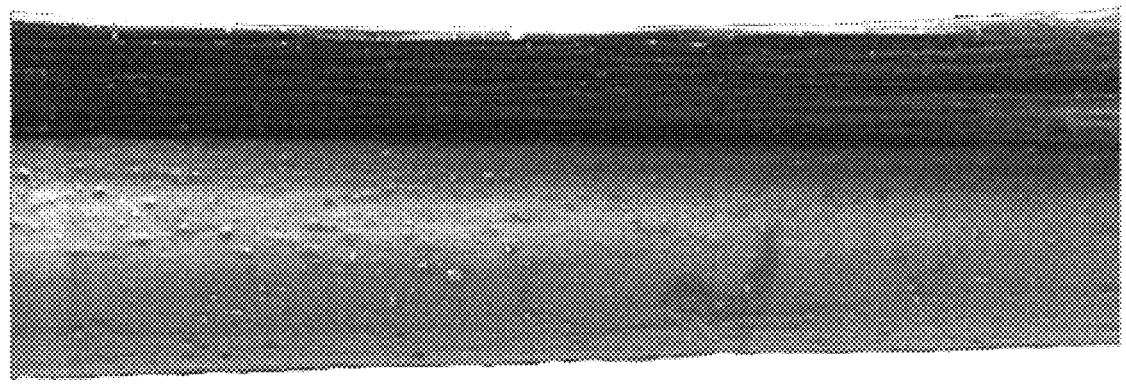

Field-aligned SWNT may be assembled into a three-dimensional structure in which the tubes are aligned substantially parallel to each other. FIGS. 4(a)–(f) are TEM micrographs of such structures according to several embodiments of the present invention. FIG. 4(f) shows a 20 micron thick aligned structure on top of a 50 micron-diameter gold wire (for scale, the wire is about as thick as a human hair). A cross-section of this structure contains about $10^8$ aligned SWNT.

In one embodiment, the three-dimensional structure may be a fiber containing parallel SWNT. An example of such a structure is shown in FIG. 4(e) and FIG. 16.

The formation of the three-dimensional structure may be further enabled by chemical treatment of the tubes. The chemical treatment may include known chemical treatments, such as sidewall derivatization or end derivatization, which is known to those skilled in the art of nanotube chemistry. (cf. "Fluorination of Single Wall Carbon Nanotubes," E. T. Mickelson, C. B. Huffman, A. G. Rinzler, R. E. Smalley and R. H. Hague, *Chem. Phys. Lett.*, 296, 188 (1998); "Reversible Sidewall Functionalization of Buckytubes," P. Boul, J. Liu, E. Mickelson, C. Huffman, L. Ericson, 1. Chiang, K. Smith, D. T. Colbert, R. Hague, J. Margrave, R. E. Smalley, *Chem. Phys. Lett.* Chemical Physics Letters, 310, 367 (1999).) The inventions here include that chemical treatment of the tubes enables their self-assembly into macroscopic ordered structures under the influence of chemical forces alone, that chemical treatment enables use of higher concentrations of SWNT in suspensions that facilitate alignment of SWNT in magnetic fields and viscous flow fields enabling the formation of macroscopic three-dimensional structures of aligned nanotubes.

Another embodiment of a three-dimensional structure comprises a membrane of substantially parallel SWNT oriented perpendicular to the plane of the membrane, which is used as a template as described above for growth of a larger three-dimensional structure.

Another embodiment of a three dimensional structure obtained through the action of derivatization agents is one in which the ends of SWNT are be selectively derivatized with different derivatizations on the side and only one end, or with different compounds on opposite ends. If the end-derivatization is hydrophobic and the side and other-end derivatizations are hydrophilic, such tubes will form a self-assembled monolayer (like a Langmuir-Blodgett film) at a water surface. Thus derivatization affects the interaction of SWNT with solvents in ways that enable formation of three-dimensional ordered objects and structures, particularly at the interfaces of liquid media. When the SWNT can be concentrated at the interface between different liquids in this way, electric fields are particularly effective in effecting their alignment; because, in conductive solutions, strong electric fields generally exist only at interfaces between different constituents or between the solution and an electrode.

Crystallization by evaporation of solvent may be used to orient SWNT on highly-ordered pyrolytic graphite (HOPG). This has been shown experimentally, where the alignment of SWNT on the HOPG surface was consistent with the surface structure. Similarly, macroscopic ordered structures of SWNT segments are formed by crystallization of SWNT from suspensions by evaporation of the suspending agent.

Manipulation of colloidal suspensions and solutions of large molecules or particles by electric fields in the liquid is the basis of several electrophoretic techniques. The inventive step is to use the electric field manipulation in a magnetic field or in the absence of a magnetic field to create macroscopic objects of oriented SWNT. Here the electric field is used to gently move the SWNT segments closer to one another in a particular region of the apparatus to effect their assembly.

f. Suspension of SWNT in a Solid According to one embodiment of the present invention, the SWNT may be suspended in a solid through polymer/sol-gel manipulation. First, the SWNT are suspended in a polymer/sol-gel material in its liquid state, and are then aligned in a magnetic field; or if the polymer/sol-gel material is sufficiently viscous, the alignment is obtained by the traditional methods of spinning and drawing a fiber from the polymer gel material, wherein shear forces occurring as the fiber is formed and elongated serve to align the SWNT and ropes in the direction of fiber drawing. The material surrounding the SWNT is then converted to a solid, "trapping" the aligned SWNT in the matrix. The subsequent matrix is macroscopic, ordered material comprising SWNT, which is itself useful. This distinct composition of matter, which is an intermediate step toward anordered macroscopic object of SWNT is useful in itself as a fiber, as a composite material with novel mechanical, electronic and thermal properties. This ordered SWNT-matrix composite is subject to further post-processing (either by heating or chemical means) to remove the matrix material, resulting in further SWNT "roping" thus producing a macroscopic, ordered SWNT material comprising only nanotubes. Likewise, the post-processing can convert the matrix to another form that is useful as a composite with oriented nanotubes incorporated. The solid material may be used as a composite in a manner known to one of ordinary skill in the art. For example, the material may be layered with the SWNT offset by 90° to increase the strength and toughness of the resulting composite.

Likewise the matrix used can be a metal, such as aluminum, which admits alignment of the SWNT by the methods described above. Magnetic alignment is achieved only when the metal is molten but alignment by viscous forces can be obtained after the metal has solidified as well. The metal forms a composite material with aligned SWNT incorporated that has desirable properties such as improved toughness, increased strain-to failure, and modified thermal and electrical conduction properties compared to those of the pure metal. Removal of the metal matrix by means known to those skilled in the art, such as acid etching, heating, etc. will result in production of an ordered SWNT material.

g. Heat Annealing of SWNT Assemblies

In another embodiment, further processing of the ordered structures and "ropes" joins the ends of essentially-collinearly-arranged and abutting segments of SWNT. In the process of heating or annealing the aligned SWNT containing mixture to approximately 300° C., the volatiles in the mixture will evaporate. The single wall nanotubes are mobile in the solution environment, and as they are generally of different helicity or chirality, there is low resistance to tubes sliding lengthwise. As described elsewhere, the tubes tend to settle in a minimum energy state, parallel to a magnetic field. Single wall nanotubes caused to come out of suspension while thus aligned, adhering to one another, form into ropes, wherein many of the ends of individual single wall nanotubes that are end to end adjacent will likely touch or nearly touch. Further processing combines such segments into a single tube within the ordered assembly by exposing the ropes to a temperature of between 300° C. and 1500° C., and most preferably between 900° C. and 1300° C. The adjacent hemispherical fullerene end caps rearrange their chemical bonding so that segments are substantially joined by covalent bonds, "welding together" or contiguously forming a single tube from two adjacent tubes. Packed aligned single wall nanotubes can be "welded" or joined in spite of differing chirality and diameter. Indications of the effectiveness of the process can be verified by studying changes in electrical conductivity along the magnetic axis, and change in along axis elastic and tensile strength behavior.

In alternate embodiments other treatments of the end adjacent single wall nanotubes similarly join the two segments into a single longer tube. The invention thus extends to heat treatment, treatment with energetic particle radiation, electron beam bombardment, and heat treatment in the presence of $H_2$.

2. Apparatuses a. Filter Apparatus

Figure 5:
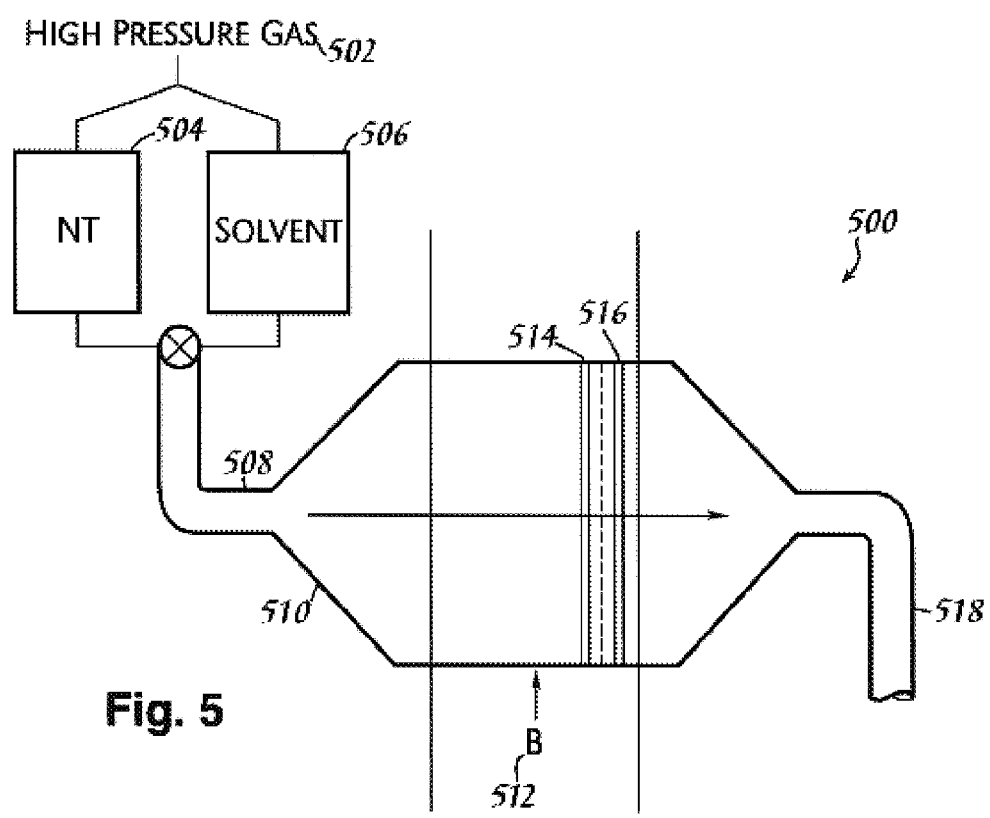
FIG. 5 is a schematic of an apparatus for producing a membrane of aligned SWNT according to one embodiment of the present invention.

Referring to FIG. 5, an apparatus for producing a membrane of aligned SWNT is provided. Apparatus 500 includes source of suspended SWNT 504 and source of solvent 506. The SWNT and/or ropes of SWNT are suspended in a suitable suspending agent, such as DMF. Solvent 506 is a water-Triton-X solution. High-pressure gas source 502 (about 2–3 atm.) is provided to force SWNT and solvent to mix in inlet 508, and to enter tank 510.

In another embodiment, a vacuum is used instead of a high-pressure gas source in order to cause the suspended SWNT and/or ropes of SWNT to move toward outlet 518.

The suspended SWNT at 10–50 milligrams per liter in a suspending agent such as Triton-X and water flow at a rate of from about 100 milliliters/hour to about 1 milliliters/hour.

As the suspended SWNT are forced toward outlet 518, they pass through magnetic field 512. Various sources for magnetic field 512 are provided. In one embodiment, a superconducting electromagnetic is used. In another embodiment, an electromagnet is used. In another embodiment, a permanent magnet is used. Other suitable magnetic field sources may be used.

The magnetic field produced by the magnetic source is preferably be at least 0.5 T. In one embodiment, the magnetic field has field strength of 25 T. In another embodiment, the strength and/or orientation of magnetic field 512 may vary with time.

In one embodiment, an electric field is be provided. The electric field is provided in addition to, or instead of, the magnetic field. The electric field is provided by any suitable electric field source. In a variant of this embodiment, the electric field assists the SWNT in moving toward filter 514.

Magnetic field 512 may be applied perpendicular to, or parallel to, the flow of the SWNT. In FIG. 5, magnetic field 512 is applied perpendicular to the flow of the SWNT. Other suitable application angles may also be used.

As discussed above, magnetic field 512 causes the SWNT to align. The SWNT continue to flow to screening element 514. Screening element 514 may be a filter. In one embodiment, screening element 514 is a syringe filter. Screening element 514 may be supported by support 516, which is a glass frit, or a similar material.

The aligned SWNT are not able to pass through screening element 514 because of their length. The SWNT thus form a material of aligned SWNT on the surface of screening element 514. The solvent, no longer containing SWNT, continues to flow to outlet 518.

Depending on the size and orientation of the SWNT, flow rate of the SWNT solution, and the pore size of screening element 514, a number of SWNT may nevertheless pass through filter screening element, support 516, and flow to exit 518.

The SWNT may continue to accumulate on screening element 514, forming a thicker material. In one embodiment, the membrane may reach a thickness of about 10 microns or greater. As the aligned SWNT accumulate, the flow rate through screening element 514 may decrease significantly.

b. Filter Apparatus with Migration

Figure 6:
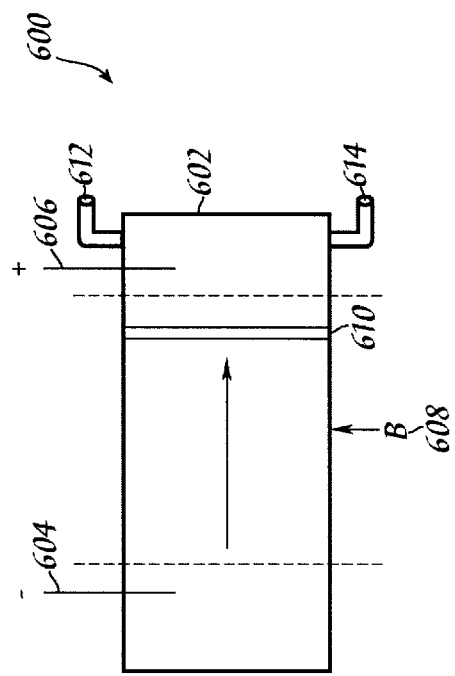
FIG. 6 is a schematic of another apparatus for producing a membrane of aligned SWNT according to one embodiment of the present invention.

According to another embodiment of the present invention, an apparatus for producing a membrane of aligned SWNT is provided. Referring to FIG. 6, apparatus 600 includes tank 602, which is a beaker or a similar container, having electrodes 604 and 606. In one embodiment, electrode 604 is the negative electrode, and electrode 606 is the positive electrode.

Tank 602 contains a suspension of SWNT. According to one embodiment, the SWNT are suspended in a water-Triton-X solution. Other suitable solutions may be used.

Magnetic field 608 is applied to the suspension of SWNT in tank 602. Magnetic field 608 is produced by a suitable magnetic field source, such as a permanent magnet, an electromagnet, a superconducting electromagnet, or the like.

Magnetic field 608 produced by the magnetic source preferably has a field strength of at least 2 T. In one embodiment, the strength and/or orientation of magnetic field 608 may vary with time. For example, the magnetic field may start from about 2 T to about 5 T, and then increase to about 15 T.

In one embodiment, an electric field is provided. The electric field may be provided in addition to, or instead of, the magnetic field. The electric field is provided by any suitable electric field source.

Magnetic field 608 may be applied perpendicular to, or parallel to, the flow of the SWNT. In FIG. 6, magnetic field 608 is applied perpendicular to the flow of the SWNT. Other suitable application angles may also be used.

Tank 602 also includes filter 610. An ionic salt, such as $Mg^{+2}$, is introduced to tank 602 through inlet 612 to flocculate the suspended SWNT.

Once the electrodes are biased following the application of a voltage differential, the $Mg^{+2}$ ions migrate to negative electrode 604. The SWNT migrate to positive electrode 606 side of tank 602. As the SWNT migrate to positive electrode 606, they align in magnetic field 608, as discussed above. The SWNT then interact with filter 610, which is supported by an object, such as a glass frit. The aligned SWNT are not able to pass through filter 610, and form a membrane of aligned SWNT on the surface of filter 610.

Depending on the size and orientation of the SWNT, as well as the flow rate of the SWNT solution, and the pore size of filter 610, a number of SWNT may nevertheless pass through filter 610 and any supporting structure, and flow to positive electrode 606.

The SWNT may continue to accumulate on filter 610, forming a thicker material. In one embodiment, the material reaches a thickness of about 10 microns.

In one embodiment, the filter is flushed with isopropyl alcohol to remove excess surfactant remaining on the filter. The filter and material are then dried.

Once the desired thickness is reached, the material may be removed from the filter, and turned on its edge in the "bed of nails" configuration.

c. No Bias to Electrodes

Figure 7:
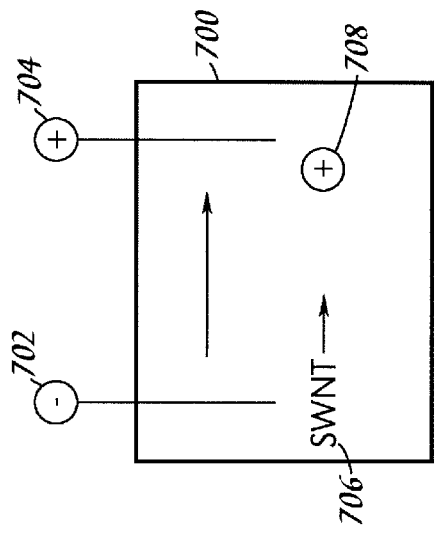
FIG. 7 is a schematic of another apparatus for producing a membrane of aligned SWNT in which no bias is applied to the electrodes, according to one embodiment of the present invention.

According to an alternate embodiment of the present invention, no bias is applied to the electrodes. Referring to FIG. 7, tank 700, which may be a beaker, is provided with two electrodes 702 and 704. In one embodiment, electrode 702 is the negative electrode, and electrode 704 is the positive electrode. Electrode 704 is made of an ion-producing material, such as magnesium.

Tank 700 may be filled with SWNT 706 that are suspended in a suitable suspending agent, such as DMF. As a magnetic field is applied, the SWNT 706 align, and form bundles of aligned SWNT. $Mg^{+2}$ ions 708 are released from electrode 704, and assist the SWNT bundles in separating from their solution.

The SWNT may then descend to the bottom of tank 700, where they are later collected.

In one embodiment, an electric field is provided to assist the SWNT bundles in migrating to the bottom of tank 700.

d. Suspended SWNT

Figure 8:
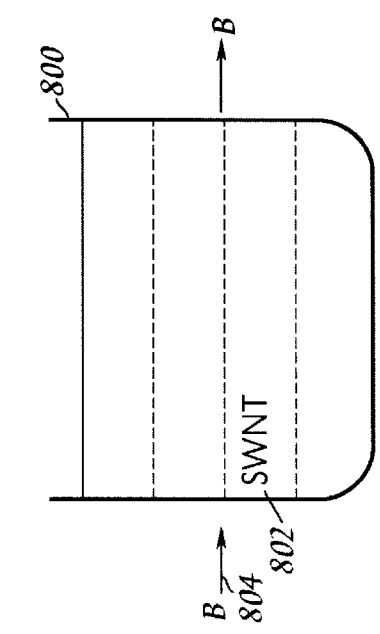
FIG. 8 is a schematic of another apparatus for producing a membrane of aligned SWNT according to one embodiment of the present invention.

According to another embodiment of the present invention, SWNT are exposed to a magnetic field to align, and then fall to the bottom of a container. Referring to FIG. 8, tank 800, which may be a beaker, is provided with a solution of suspended SWNT. In one embodiment, SWNT 802 are suspended in a suitable solution, such as DMF or a water-Triton-X solution.

Magnetic field 804 is applied to tank 800, causing SWNT 802 to align. In one embodiment, magnetic field 804 has a field strength from about 0.5 T to about 30 T. In one embodiment, magnetic field 804 has a field strength of 25 T.

As SWNTs 802 align, they interact, forming bundles of aligned SWNT. As more SWNT are added to the bundle, the SWNT bundles become heavier, and sink to the bottom of tank 800. The SWNT bundles may then be removed from tank 800.

In one embodiment, an electric field is provided to assist the SWNT bundles in sinking to the bottom of tank 800. Because the SWNT bundles have a net charge residing on their outer layer, an electric field applied with an appropriate orientation will cause the SWNT bundles to migrate to the bottom of tank 800 faster than by gravity alone.

e. Multiple Compartment Apparatus I

Figure 9:
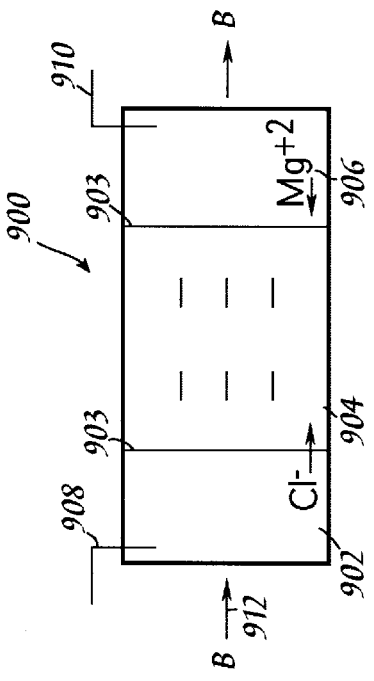
FIG. 9 is a schematic of an apparatus for producing aligned SWNT bundles according to one embodiment of the present invention.

Referring to FIG. 9, an apparatus for producing aligned SWNT bundles according to one embodiment of the present invention is provided. Device 900 contains three compartments: first compartment 902, second compartment 904, and third compartment 906. First and third compartments 902 and 906 are filled with a $MgCl_2$ solution, while second compartment 904 contains a solution of suspended SWNT, such as DMF or a water-Triton-X solution.

The compartments are separated by a support, such as glass frit 903.

Electrodes 908 and 910 are provided in first and second compartments 902 and 906, respectively. Magnetic field 912 is applied to the device.

As a potential is applied, making electrode 908 the negative electrode and electrode 910 the positive electrode, $Mg^{+2}$ ions migrate from compartment 906 toward electrode 902, and Cl ions migrate from compartment 902 to electrode 910.

Magnetic field 912 causes the SWNT to align, and the SWNT form bundles of aligned SWNT. The $Mg^{+2}$ and $Cl^-$ ions cause the SWNT bundles to fall out of solution, and form a mat of SWNT bundles on the bottom of first compartment 902.

An electric field (not shown) may be provided to assist the SWNT bundles in migrating to the bottom of compartment 904, as described above.

f. Multiple Compartment Apparatus II

Figure 10:
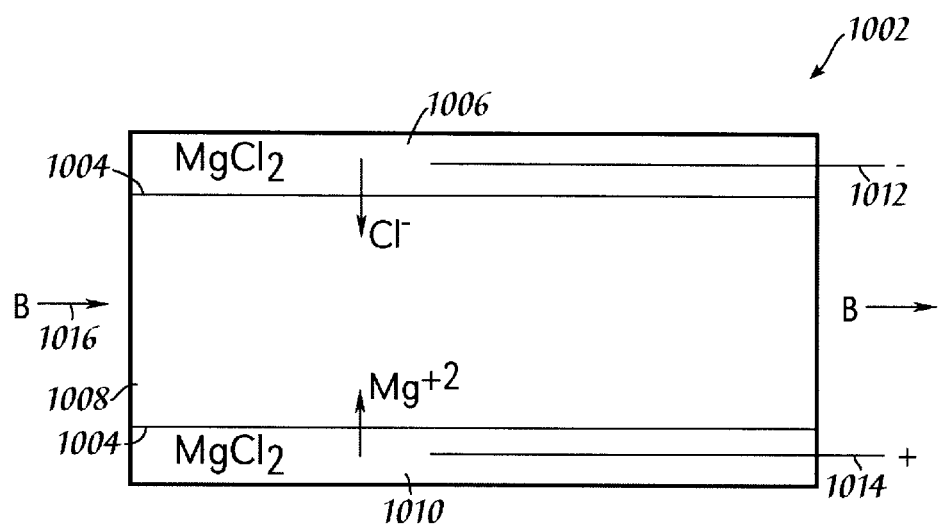
FIG. 10 is a schematic of another apparatus for producing aligned SWNT bundles according to one embodiment of the present invention.

According to another embodiment of the present invention, another multiple compartment device is provided. Referring to FIG. 10, device 1002 contains first compartment 1006, second compartment 1008, and third compartment 1010. The compartments may be separated by support 1004, which may be a glass frit.

First compartment 1006 and third compartment 1010 may contain electrodes 1012 and 1014. In one embodiment, electrode 1012 is the negative electrode, where electrode 1014 is the positive electrode.

First compartment 1006 and third compartment 1012 may be provided with a $MgCl_2$ solution, while second compartment 1008 contains a solution of suspended SWNT, such as DMF or a water-Triton-X solution.

In this embodiment, as the SWNT align, the form bundles of aligned SWNTs. When a potential is provided to electrodes 1012 and 1014, the $Mg^{+2}$ ions travel from third compartment 1010 to second compartment 1008, while the $Cl^-$ ions travel from first compartment 1006 to second compartment 1008. The SWNT bundles then separate from suspension, and fall on glass frit 1004 on the bottom of second compartment 1008.

3. Utility

Applications for macroscopic ordered assemblies of carbon nanotubes include high strength fiber and cable, electrical transmission lines, structural materials, impactresistant materials, armor, structural laminates having layers with different tube orientations, pressure vessel exteriors and reinforcement, thermal management materials (e.g., heat-transporting materials), heat-resistant materials, airframes and airframe components for aircraft and missiles, vehicle bodies, ship hulls, chemically inert materials, electrochemical electrodes, battery electrodes, catalyst supports, biologically-inert materials, sensors, and trasducer (e.g., electrical-to-mechanical) elements. The ordered assemblies are useful by themselves, but also are useful as elements of composite materials, where they add strength, toughness, electrical conductivity, thermal conductivity, and novel electromagnetic properties.

Magnetic alignment of suspensions of SWNT in a suitable material that will solidify to a transparent form can be used as materials of that serve as optical polarizers. Applications include optical instrumentation and sunglasses.

Alignment of SWNT by chemical means forms extensive network structures that are flexible, but electrically and mechanically continuous. An example of such a network appears in FIG. 16, but when the network forms in a supporting matrix, such as a polymer, it is much more sparse, to the point of being diaphanous.

The material may be used as an optical limiter. The protection of eyes and sensors from damage due to sources of intense light, such as laser radiation, is a problem of current interest in both commercial and military environments. Nonlinear optical materials (materials whose optical properties, such as the index of refraction or absorption coefficient, are dependent on the intensity of the incident light) have been used in passive optical devices designed to reduce or limit the fraction of light transmitted through the device as the incident intensity is increased. The SWNT membranes of he present invention could be used to prevent the passage of harmful laser radiation. This could be used in safety goggles, binoculars, other optical devices, and in protective coverings for electro-optical sensors.

Light reflected from the in-plane membranes fabricated by the filtration technique is strongly polarized. This property of in-plane membranes enables use of in-plane material as a polarizer.

Figure 11A:
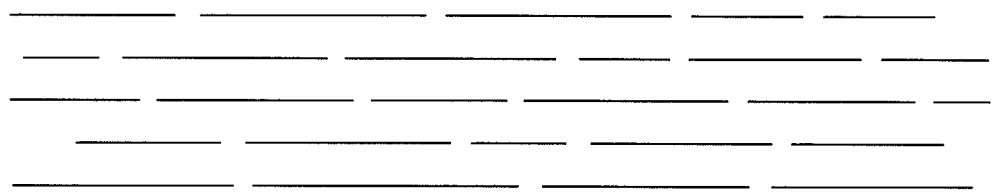
FIGS. 11(a) and (b) are depictions of the material formed according to one embodiment of the present invention.
Figure 11B:
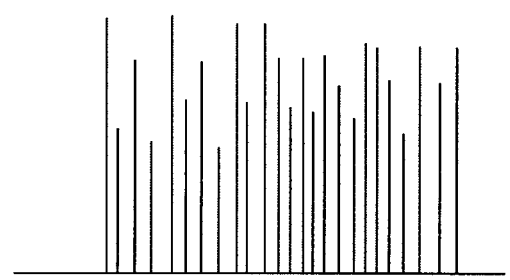
Figure 12A:
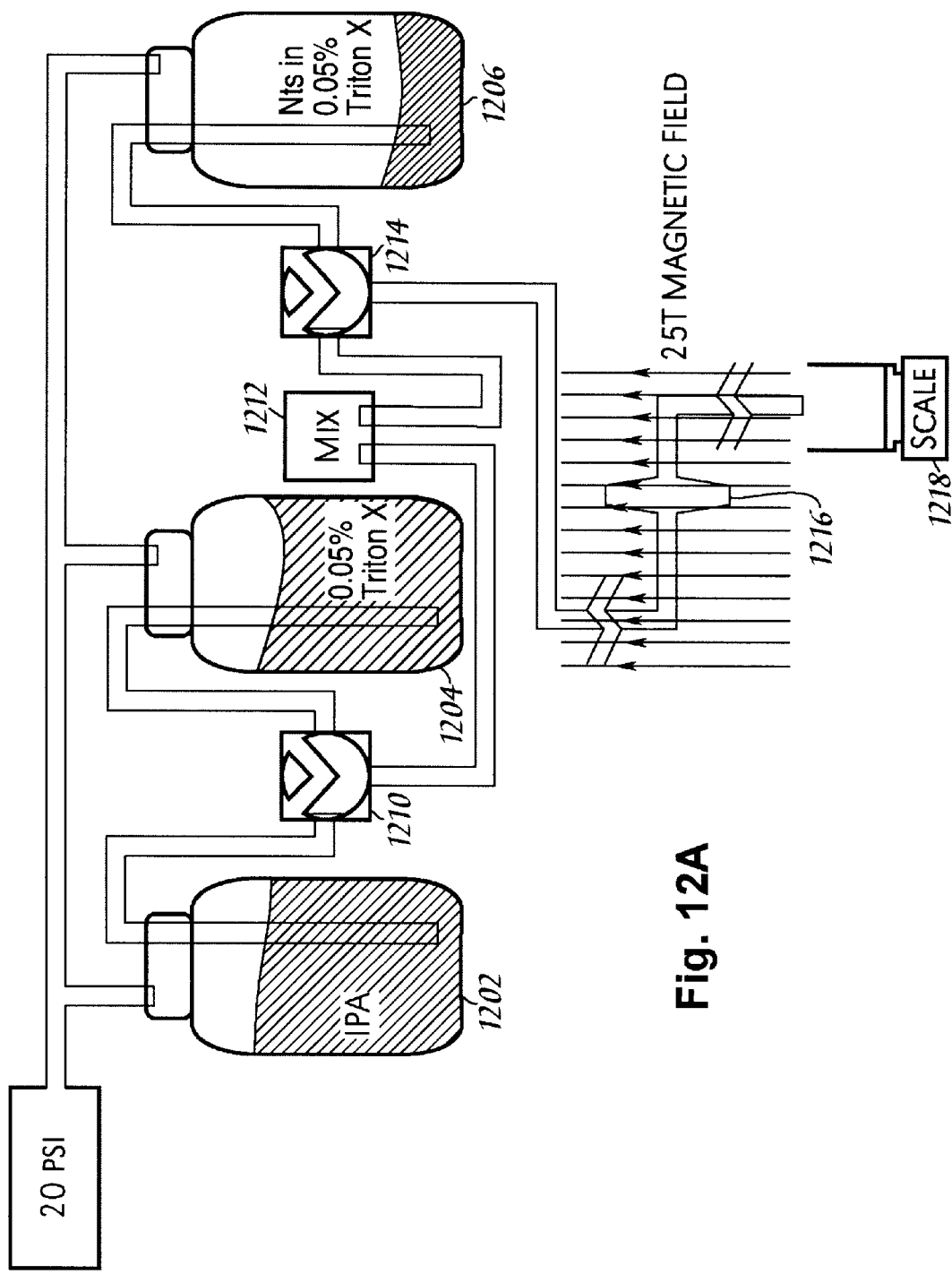
FIGS. 12(a)–(d) is a schematic of an apparatus used in an experiment for producing aligned SWNT according to one embodiment of the present invention.
Figure 12B:
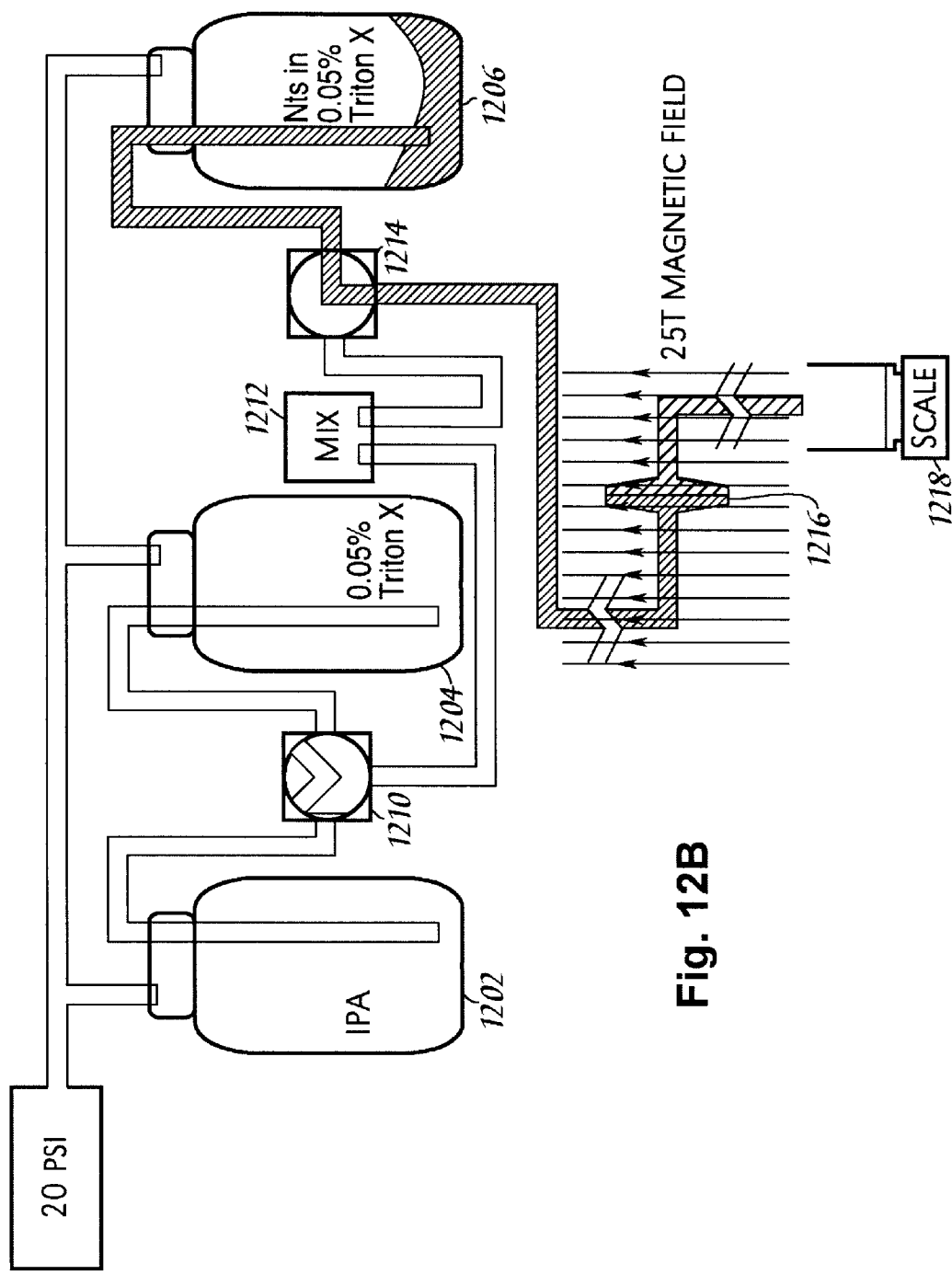
Figure 12C:
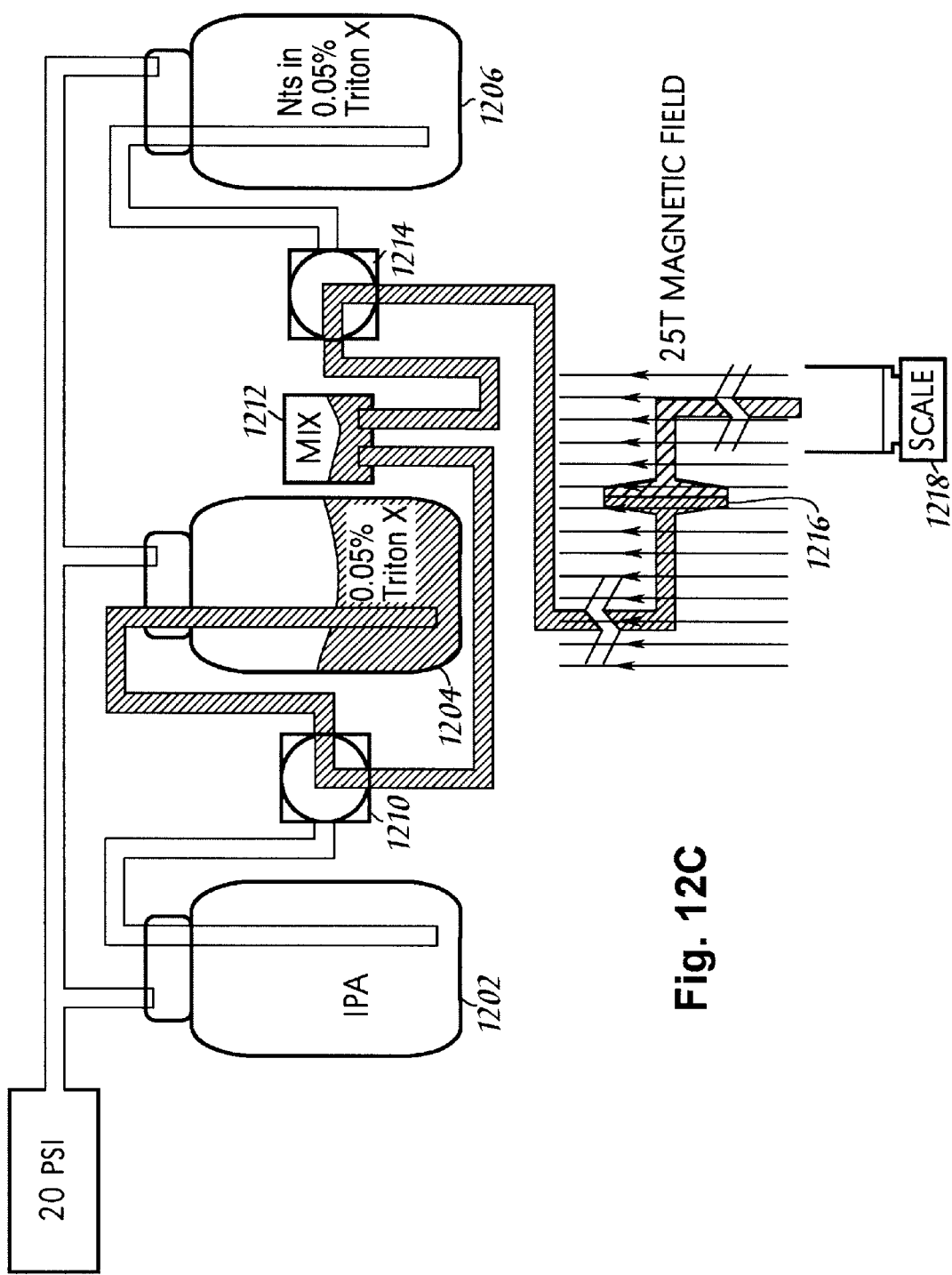
Figure 12D:
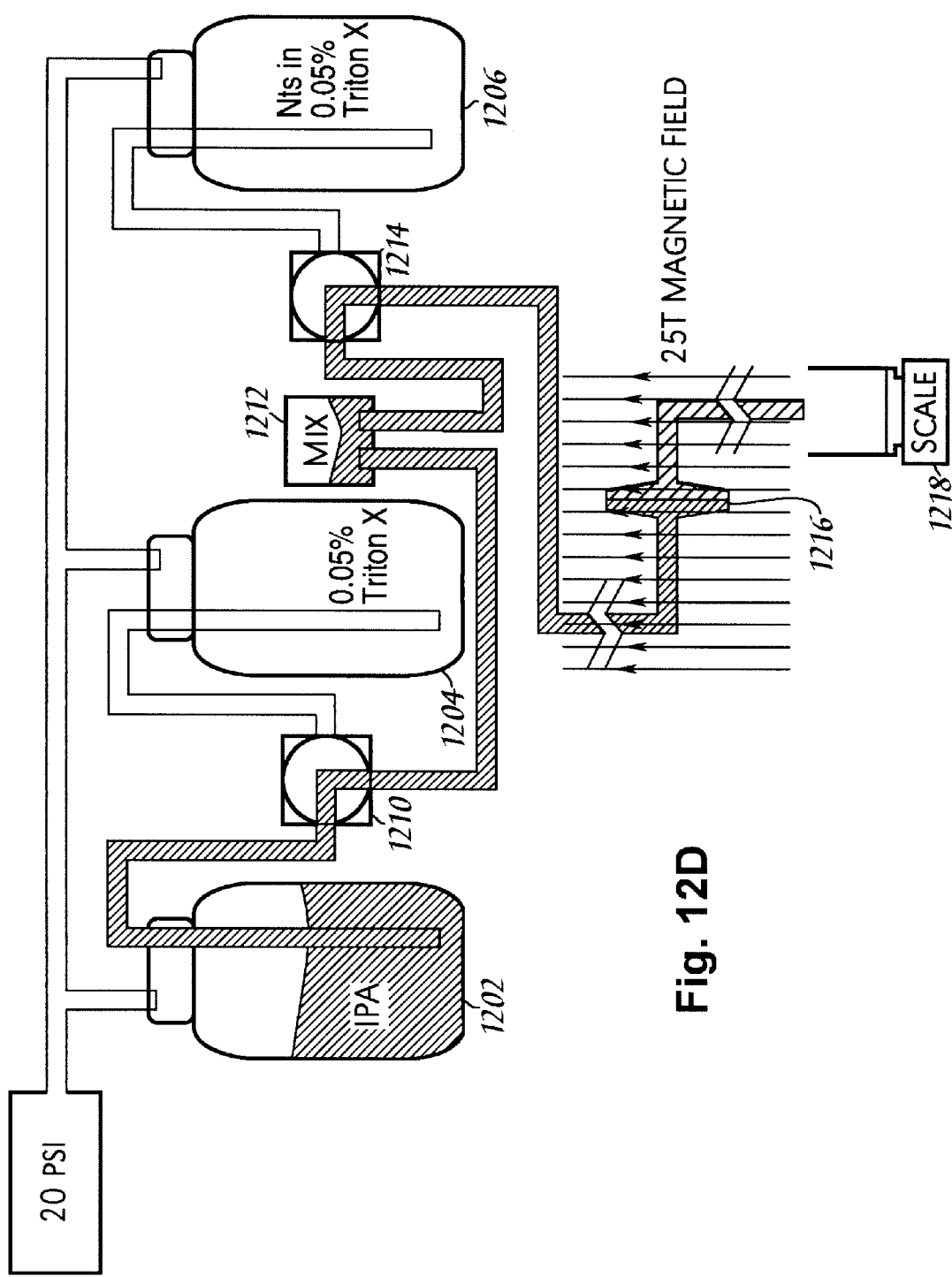

The material of the present invention may have a unique structure. Referring to FIGS. 11A–11B, according to one embodiment of the present invention, the material of the present invention comprises multiple ropes that may have different lengths that are substantially aligned. Because of their different lengths, however, the ropes do not necessarily share common starting and ending points. Instead the ropes in the material resemble bricks in a wall.

The material of the present invention is particularly useful as a support for intercalating agents, which themselves have a subsidiary function. For example, the material of the present invention is well suited as the anode of a lithium-ion battery as it is an excellent conductor of electricity and heat, and presents an enormous surface area on which lithium ions will reside after they intercalate the ordered structure by moving between and/or into the SWNT.

The material of the present invention may be cut, and placed on its end. The ropes may extend from the material at different lengths. This may be used as an array from which SWNTs are grown.

EXAMPLES

In order to facilitate a more complete understanding of the invention, a number of Examples are provided below. However, the scope of the invention is not limited to specific embodiments disclosed in the Examples, which are for purposes of illustration only.

1. Filter Apparatus

Referring to FIG. 12(*a*), materials of substantially aligned SWNT were formed with the following device. Container 1202 contained isopropyl alcohol (IPA). Container 1204 contained a 0.05% solution of Triton X. Container 1206 contained a solution of purified, well-sonicated SWNT in 0.05% Triton X. A 20 PSI air source was provided, keeping the contents of containers 1202, 1204, and 1206 under pressure. Two valves 1210 and 1214 controlled the flow of fluids from containers 1202, 1204, and 1206.

Referring to FIG. 12(*b*), the SWNT solution flowed through a 25 T magnetic field generated by a high-current coil. In the magnetic field, two Millipore Millex-GN syringe filters 1216, having 25 mm diameter nylon membrane with 0.2 mm pores, were connected in parallel. Filters 1216 primed with 0.05% Triton-X in ultrapure water ("solvent"), then suspended in a 27 T, 50 mm bore electromagnet.

After the desired amount of suspension had passed through (metered by continuously weighing the filtrate with scale 1218), the flow was switched to pure solvent from container 1204 (FIG. 12(*c*)). This was then gradually changed to isopropyl alcohol (IPA) from container 1202 by means of a mixing chamber 1212, initially full of solvent, of volume ~15 mL (FIG. 12(*d*)). IPA was allowed to flow for at least 15 minutes to remove residual surfactant. When the rinses with solvent and IPA were omitted, the nanotubes remained in a concentrated liquid suspension at the filter surface but did not consolidate. This suggests that removal of the surfactant is necessary for the nanotubes to form ropes and coalesce into buckypapers or buckyribbons.

Figure 13:
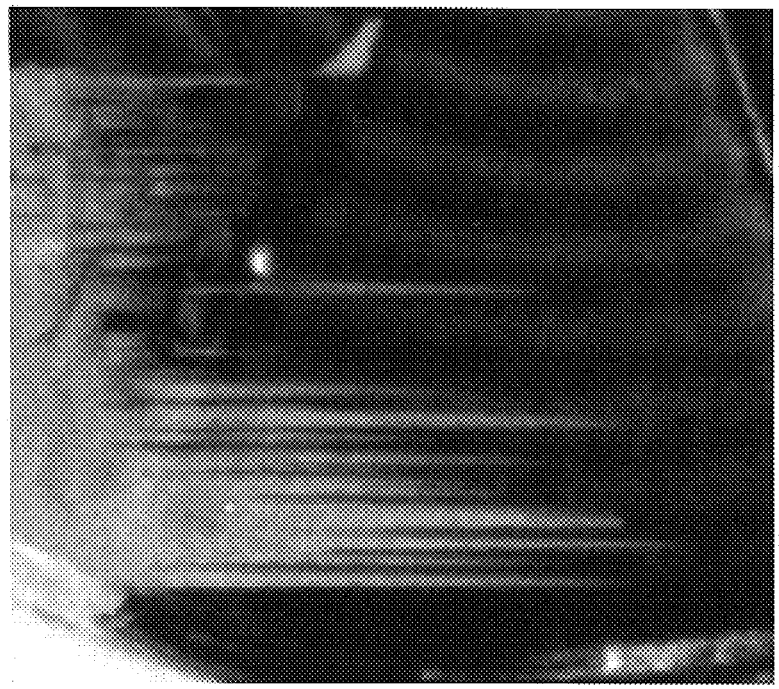
FIG. 13 is a depiction of the filter element of the apparatus of FIGS. 12(a)–(d).

Filter 1216 was removed from the magnetic field, and dried. A picture of filter 1216 is provided in FIG. 13.

Figure 14A:
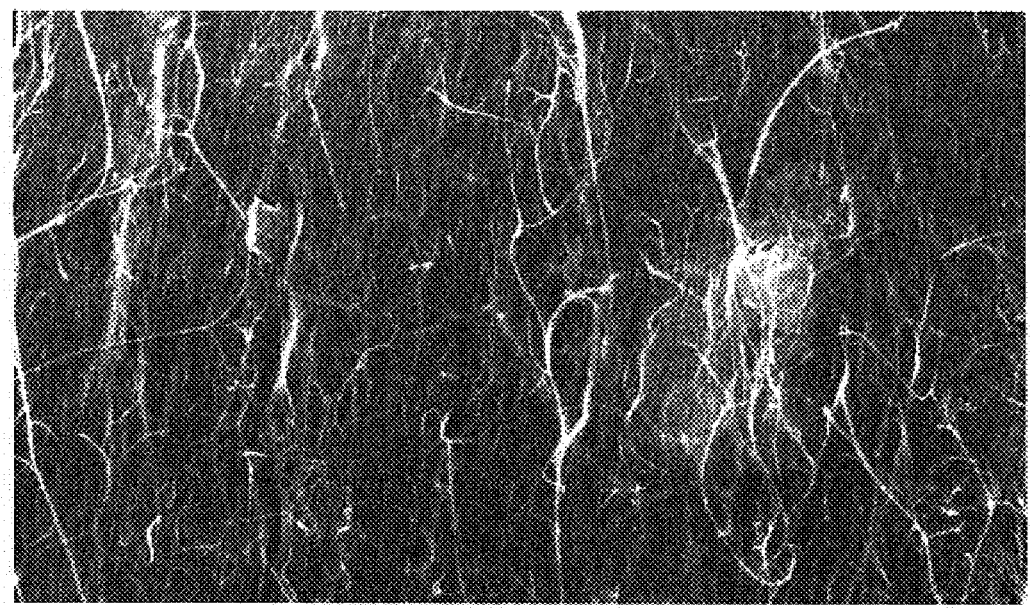
FIGS. 14(a) and (b) are drawings of the material formed by the apparatus of FIGS. 12(a)–(d).
Figure 14B:

The device and process produced a new material that is the first truly macroscopic ordered assembly of carbon nanotubes. An example of this material is shown in FIGS. 14(*a*) and (*b*). Its ribbon-like appearance and one-directional cleavage verifies that its constituent SWNT segments are highly aligned.

2. Aligning SWNT

According to one embodiment of the present invention, a method for manufacturing a material of aligned SWNT includes suspending SWNT segments in a water-Triton-X (surfactant) solution. This solution is slowly pumped through a filter assembly (standard syringe filter) that is mounted in the bore of a 27 T magnet. The magnetic field direction is in the plane of the filter membrane. The surfactant solution containing about 20 mg/l SWNT segments is pumped through the filter assembly at a rate varying from one to 0.01 cc/minute for a period of approximately one hour. After that time the filter assembly is flushed with isopropyl alcohol for a few minutes to remove excess surfactant remaining on the nanotube "filter cake" lying on top of the filter membrane. The filter membrane and cake are dried and the cake is peeled from the membrane. Scanning electron microscopy of the filter cake reveals a highly-aligned structure of SWNT.

3. SWNT in Gelatin

SWNT were suspended in a solution of Triton X (50 mg/l) in a container, such as a test tube. 5 to 15 g of Gelatin, such as that manufactured by Knox, was added to the solution. 10 ml of water at 65° C. was also added. The solution was placed in the presence of a magnet for about 30 minutes.

The result has anisotropy. The SWNT aligned and formed a solid matrix of SWNT oriented in the same direction.

4. SWNTs on Au Wire

Induced flocculation of a solution of SWNT or by electrodeposition may be used to form three-dimensional objects. According to one embodiment of the present invention, two gold wires having a thickness of about 50 μm were cleaned and then supported parallel to one another, separated by a distance of approximately 1 cm. in a suspension of SWNT segments and DMF. An electric potential of about 1 to about 5 Volts was applied between the gold wires. The resulting electric field caused SWNT to migrate to one of the wires. When about 2.5 V was applied, the aligned structures shown in FIGS. 4(*a*)–(*f*) were produced.

5. Formation of Substrate

Field-aligned suspended or solvated SWNT segments may be made to condense on a fiber material that serves as a substrate for initiation of further growth. This fiber material may include, inter alia, carbon fiber or metal wire oriented parallel to the field-alignment direction. In one experiment according to one embodiment of the present invention, the material gold covered with an amine-terminated self-assembled monolayer was used as the substrate.

The substrate may be treated with an appropriate chemical treatment. This allows a macroscopic fiber that is predominantly SWNT segments oriented parallel to one another to be formed. In this process, the fiber substrate may be introduced and continuously translated through the SWNT containing liquid within a field, with the aligned SWNT begin condensing on the substrate. The condensation process continues, enabling a continuous production process for a predominantly SWNT fiber. According to one embodiment of the present invention, a small electric field near the substrate and growing fiber to facilitate motion of SWNT segments to the fiber may be used.

6. Separation of SWNT

Techniques that separate the different types of SWNT by their different response to magnetic fields may also be used. Some types of tubes are predicted to be diamagnetic, while some paramagnetic. If a solution of suspension of mixed-type SWNT is introduced into a magnetic field with a gradient, tubes of different types will migrate in different directions with respect to the field gradient, effecting a separation by tube type. This affords a means of selecting the types of tubes that one can use in "seed arrays," allowing the growth of macroscopic arrays of a single type of tube.

In one embodiment, end-derivatized SWNT may be field-aligned and allowed to diffuse to, and chemically attach to, a substrate that is oriented perpendicular to the field-alignment direction. This process may result in a membrane (or felt) of contiguous, parallel SWNT segments aligned in a direction that is substantially perpendicular to the substrate surface. This configuration is often referred to as the "bed of nails" configuration, disclosed in PCT/US98/04513.

The membranes or arrays of substantially-aligned SWNT may be used as field emitters of electrons. Electric or magnetic fields may be used to create an array of substantially-aligned SWNT to function as a field-emitter of electrons. Field emission from SWNT and ropes of SWNT is known (cf. "Unraveling nanotubes: field emission from an atomic wire," A. G. Rinzler, J. H. Hafner, P. Nikolaev, L. Lou, S. G. Kim, D. Tomanek, P. Nordlander, D. T. Colbert and R. E. Smalley, *Science*, 269, 1550 (1995)), but the invention here is use of magnetic field alignment produces highly-oriented structures that are of the type that are particularly effective in field-emission applications such as electron sources, cathode ray tube cathodes, and flat panel display cathodes.

The three-dimensional articles that are assembled by a technique that involves field alignment of SWNT, according to the present invention, may serve as the active element (tip) of a probe microscope, including, but not limited to Atomic Force Microscopes, Scanning-Tunneling Microscopes, Chemical Force Microscopes, Magnetic Force Microscopes, or any combination thereof.

7. Chemical Manipulation and Fiber Formation.

According to one embodiment of the present invention. SWNT from the high-pressure CO process ("Gas-phase Catalytic Growth of Single-Walled Carbon Nanotubes from Carbon Monoxide," P. Nikolaev, M. J. Bronikowski, R. K. Bradley, F. Rohmund, D. T. Colbert, K. A. Smith, and R. E. Smalley, Chemical Physics Letters, 313, 91 (1999). ) were treated by heating to 90° C. in oleum forming a thick paste.

After further processing to remove the oleum and dry the SWNT material, a network of large ropes, each of which comprised highly-aligned nanotubes was observed, as shown in the electron micrograph of FIG. 15.

When the SWNT and oleum pastes was extruded through an orifice into water, the oleum dissolves rapidly in the water, leaving the formed the fibers shown in FIG. 16. These fibers comprise oriented SWNT, as is verified by analysis of the fiber by polarized Raman spectroscopy.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims.

What is claimed is:

1. A macroscopic assembly of single-wall carbon nanotubes consisting essentially of substantially aligned single-wall carbon nanotubes, wherein the single-wall carbon nanotubes comprise derivatized single-wall carbon nanotubes selected from the group consisting of end-derivatized single-wall carbon nanotubes, side-derivatized single-wall carbon nanotubes, and combinations thereof.

2. The macroscopic assembly of claim 1 wherein the macroscopic assembly is selected from the group consisting of films, fibers, structural sections, membranes, and buckypapers.

3. The macroscopic assembly of claim 1, wherein the macroscopic assembly is in the form of a membrane, and wherein the single-wall carbon nanotubes in said membrane are perpendicular to the plane of the membrane.

4. The macroscopic assembly of claim 1 wherein the macroscopic assembly is on a substrate.

5. The macroscopic assembly of claim 4 wherein the substrate comprises a component selected from the group consisting of a fiber, a metal, an ordered assembly of single-wall carbon nanotubes, and highly oriented pyrolytic graphite.

6. The macroscopic assembly of claim 4 wherein the assembly is in contact with the substrate wherein such contact is selected from the group consisting of chemical, physical, or combinations thereof.

7. The macroscopic assembly of claim 2, wherein said membrane is at least about 1 micron thick.

8. The macroscopic assembly of claim 2 wherein said membrane is at least about 10 microns thick.

9. The macroscopic assembly of claim 2 wherein said membrane is at least about 100 microns thick.

10. The macroscopic assembly of claim 2 wherein the single-wall carbon nanotubes in the membrane are parallel to the plane of the membrane.

11. The macroscopic assembly of claim 2 wherein the single-wall carbon nanotubes in said membrane are perpendicular to the plane of the membrane.

12. A macroscopic assembly comprising a plurality of substantially aligned single-wall carbon nanotubes, wherein the macroscopic assembly is in the form of a membrane, and wherein the single-wall carbon nanotubes in said membrane are parallel to the plane of the membrane.

13. A macroscopic assembly comprising a plurality of substantially aligned single-wall carbon nanotubes, wherein at least some of the plurality of substantially aligned single-wall carbon nanotubes are derivatized single-wall carbon nanotubes and wherein said derivatized single-wall carbon nanotubes are selected from the group consisting of end-derivatized single-wall carbon nanotubes, side-derivatized single-wall carbon nanotubes, and combinations thereof.

14. A composite material comprising single-wall carbon nanotubes and solid matrix material, wherein (a) the single-wall carbon nanotubes are substantially aligned (b) at least some of the aligned single-wall carbon nanotubes are within the solid matrix material and (c) the single-wall carbon nanotubes comprise derivatized single-wall carbon nanotubes selected from the group consisting of end-derivatized single-wall carbon nanotubes, side-derivatized single-wall carbon nanotubes, and combinations thereof.

15. The composite material of claim 14 wherein at least some of the single-wall carbon nanotubes are in substantially aligned ropes that form a network within the solid matrix material.

16. The solid matrix material of claim 14 wherein the solid matrix material is selected from the group consisting of polymer, sol-gel, and metal.

17. A composite material comprising substantially aligned single-wall carbon nanotubes and solid matrix material, wherein at least some of the substantially aligned single-wall carbon nanotubes are within the solid matrix material and the single-wall carbon nanotubes are derivatized single-wall carbon nanotubes selected from the group consisting of end-derivatized single-wall carbon nanotubes, side-derivatized single-wall carbon nanotubes, and combinations thereof.

18. An probe microscope that comprises a tip of the probe microscope, wherein the tip comprises a material assembled by field-alignment of a macroscopic amount of single-wall carbon nanotubes.

19. A macroscopic assembly comprising a macroscopic amount of substantially aligned single-wall carbon nanotubes, wherein (a) the macroscopic assembly is in a form of a membrane (b) the membrane is at least 1 micron thick, and (c), the single-wall carbon nanotubes in said membrane are parallel to the plane of the membrane.

\* \* \* \* \*

UNITED STATES PATENT AND TRADEMARK OFFICE
CERTIFICATE OF CORRECTION

PATENT NO.         : 6,790,425 B1
APPLICATION NO. : 09/890030
DATED                 : September 14, 2004
INVENTOR(S)       : Smalley et al.

Page 1 of 1

It is certified that error appears in the above-identified patent and that said Letters Patent is hereby corrected as shown below:

On the title page item (75), should read:

Richard E. Smalley, Houston, TX (US);
Daniel T. Colbert, Houston, TX( (US);
Ken A. Smith, Katy, TX (US);
Deron A. Walters, Orlando, FL (US):
Michael J. Casavant, Houston, TX (US);
Chad B. Huffman, Houston, TX (US);
Boris I. Yakobson, Houston, TX (US);
Robert H. Hauge, Houston, TX (US);
Rajesh Kumar Saini, Albuquerque, NM (US);
Wan-Ting Chiang, Sugerland, TX (US);
Xiao Chuan Qin, Hanover, NH (US).

On the title page item (86), after "PCT/US00/29722" insert
--filed Oct. 27, 2000, which claims priority to 60/161,717 filed Oct. 17, 1999--

Signed and Sealed this

Fifth Day of December, 2006

JON W. DUDAS
*Director of the United States Patent and Trademark Office*